(12) United States Patent
Kikuchi

(10) Patent No.: US 10,999,492 B2
(45) Date of Patent: May 4, 2021

(54) FOCUS ADJUSTMENT DEVICE AND FOCUS ADJUSTMENT METHOD

(71) Applicant: Olympus Corporation, Hachioji (JP)

(72) Inventor: Tetsuo Kikuchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 16/902,175

(22) Filed: Jun. 15, 2020

(65) Prior Publication Data
US 2020/0412966 A1 Dec. 31, 2020

(30) Foreign Application Priority Data

Jun. 26, 2019 (JP) .............................. JP2019-118802

(51) Int. Cl.
*H04N 5/232* (2006.01)
*G03B 7/00* (2021.01)
*G02B 7/34* (2021.01)

(52) U.S. Cl.
CPC ......... *H04N 5/232122* (2018.08); *G02B 7/34* (2013.01); *G03B 7/00* (2013.01); *H04N 5/23245* (2013.01)

(58) Field of Classification Search
None
See application file for complete search history.

(56) References Cited

U.S. PATENT DOCUMENTS

| | | | |
|---|---|---|---|
| 10,812,704 B2* | 10/2020 | Kikuchi | H04N 5/23245 |
| 2014/0009643 A1* | 1/2014 | Ito | H04N 5/772 |
| | | | 348/239 |
| 2018/0063413 A1 | 3/2018 | Yoshino | |
| 2018/0152621 A1* | 5/2018 | Takinoiri | H04N 5/232933 |
| 2019/0238748 A1* | 8/2019 | Yoshida | H04N 5/23293 |
| 2019/0387172 A1* | 12/2019 | Haruna | H04N 5/345 |
| 2020/0021744 A1* | 1/2020 | Kikuchi | H04N 5/23245 |

FOREIGN PATENT DOCUMENTS

| | | |
|---|---|---|
| JP | 2015-005853 | 1/2015 |
| JP | 2015-161906 | 9/2015 |

\* cited by examiner

*Primary Examiner* — Cynthia Segura
(74) *Attorney, Agent, or Firm* — John C. Pokotylo; Pokotylo Patent Services

(57) ABSTRACT

A focus adjustment device, comprising a processor that, during rapid shooting of still pictures, displays an image or performs processing for storage as still picture data based on a pixel signal output as a result of the first imaging operation from the image sensor, generates focus adjustment data by performing focus detection based on a pixel signal output as a result of the second imaging operation, and executes focus control, wherein the processor computes focus movement amount based on the focus adjustment data, and if the focus movement amount is larger than a predetermined value, and focus control based on the focus movement amount and the first imaging operation are executed in parallel, prohibits processing for storage as a still picture on image data based on a pixel signal of the first imaging operation.

20 Claims, 15 Drawing Sheets

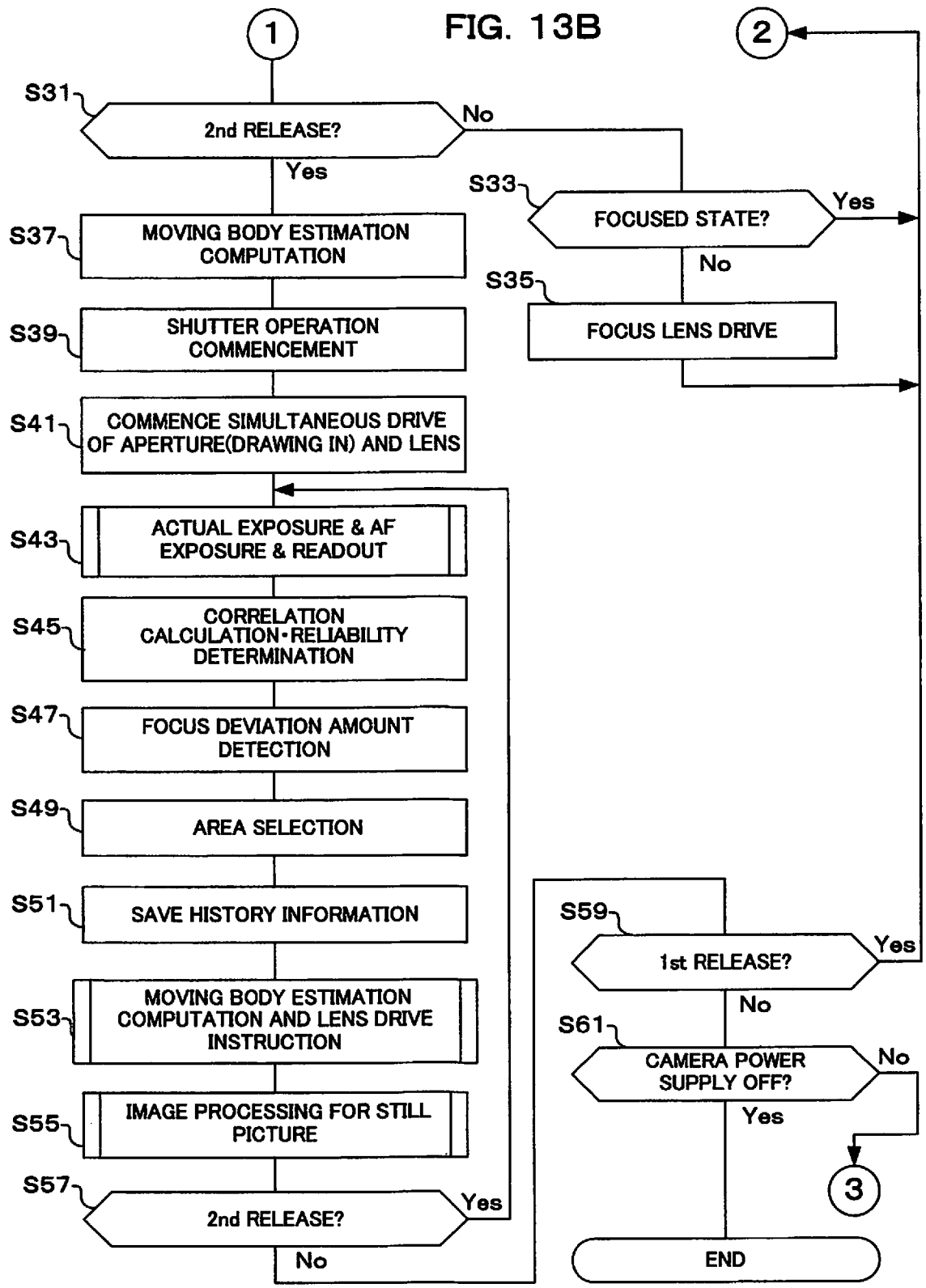

FOCUS ADJUSTMENT DEVICE AND FOCUS ADJUSTMENT METHOD

CROSS-REFERENCE TO RELATED APPLICATIONS

Benefit is claimed, under 35 U.S.C. § 119, to the filing date of prior Japanese Patent Application No. 2019-118802 filed on Jun. 26, 2019. This application is expressly incorporated herein by reference. The scope of the present invention is not limited to any requirements of the specific embodiments described in the application.

BACKGROUND OF THE INVENTION

1. Field of the Invention

The present invention relates to a focus adjustment device having an image sensor that is provided with focus detection pixels for phase difference detection and that performs focus adjustment of a focus lens based on a pixel signal from the focus detection pixels, and to a focus adjustment method.

2. Description of the Related Art

Conventionally there has been proposed a focus adjustment device that comprises an image sensor on which are arranged image pixels that output an image signal and focus detection pixels that output a focus detection signal for phase difference detection. For example, Japanese patent laid open number 2015-161906 (hereafter referred to as "patent publication 1") proposes changing exposure for time focus detection pixels and image pixels for every line, and respectively reading out. Also, Japanese patent laid open number 2015-005853 (hereafter referred to as "patent publication 2") proposes a method of respectively reading out divided pixels within focus detection pixels for every line, and a method of adding outputs of divided pixels and reading out.

Further, an imaging device disclosed in Japanese patent laid open number 2018-031907 (hereafter referred to as "patent publication 3") alternately repeats focus and metering processing sensor drive, and still picture sensor drive, in a rapid shooting operation that repeatedly performs automatic focus adjustment (AF) and still picture shooting. This imaging device drives a focus lens by predicting focus position of a subject at the time of shooting the next frame based on results of focus detection that have been acquired, during readout of a pixel signal for a still picture, and performs still picture shooting after completion of the drive.

Patent publication 1 described above only proposes reading out from an image sensor for live view, and cannot be applied to still picture shooting because it would cause degradation in still picture image quality. Also, patent publication 2 only proposes readout of phase difference information during live view. This means that with the technology disclosed in patent publication 2 it is necessary to perform a live view operation when acquiring phase difference information. When switching from a live view operation to a still picture shooting operation it is necessary to switch an imaging drive mode, and at the time of the switching an invalid frame will arise, and so still picture rapid shooting cannot be made high-speed. Further, patent publication 3 described above performs control so that still picture shooting and focus lens drive are not performed in parallel, which is a limit in making still picture rapid shooting high-speed. Thus, the conventional technology has no proposals whatsoever for preventing degradation in image quality at the time of rapid shooting of still pictures at high speed.

SUMMARY OF THE INVENTION

The present invention provides a focus adjustment device and focus adjustment method that, when rapidly shooting still pictures while performing focus adjustment, prevents degradation in image quality even if rapid shooting is performed at high-speed.

A focus adjustment device of a first aspect of the present invention comprises an image sensor with a plurality of photodiodes that have been divided in a given pupil-division direction, for a single microlens, and that generates a pixel signal by subjecting respective light fluxes that have passed through different exit pupil regions of an imaging optical system to photoelectric conversion, and further is capable of setting an imaging mode for alternately and repeatedly executing a first imaging operation to generate and output a pixel signal resulting from having combined pixel signals corresponding to the pupil-division direction, and a second imaging operation for generating and outputting a pixel signal corresponding to the pupil-division direction, and a processor that, during rapid shooting of still pictures, displays an image or performs processing for storage as still picture data based on a pixel signal output as a result of the first imaging operation from the image sensor, and generate focus adjustment data by performing focus detection based on a pixel signal output as a result of the second imaging operation, and executes focus control, wherein the processor computes focus movement amount based on the focus adjustment data, and if the focus movement amount is larger than a predetermined value, and focus control based on the focus movement amount and the first imaging operation are executed in parallel, prohibits processing for storage as a still picture on image data based on a pixel signal of the first imaging operation.

A focus adjustment method of a second aspect of the present invention is a focus adjustment method for a focus adjustment device of an imaging device having an image sensor with plurality of photodiodes that have been divided in a given pupil-division direction, for a single microlens, and that generates a pixel signal by subjecting respective light fluxes that have passed through different exit pupil regions of an imaging optical system to photoelectric conversion, and comprises alternately and repeatedly switching between a first imaging operation of generating and outputting a pixel signal resulting from having combined pixel signals corresponding to the pupil-division direction, and a second imaging operation of generating and outputting a pixel signal corresponding to the pupil-division direction, during rapid shooting of still pictures, executing focus control to display image data based on a pixel signal output as a result of the first imaging operation from the image sensor, or perform processing for storage as a still picture, and generate focus adjustment data by performing focus detection based on a pixel signal output as a result of the second imaging operation, and computing focus movement amount based on the focus adjustment data, and if the focus movement amount is larger than a predetermined value, and focus control based on the focus movement amount and the first imaging operation are executed in parallel, prohibiting processing for storage as a still picture on image data based on a pixel signal of the first imaging operation.

A non-transitory computer-readable medium of a third aspect of the present invention, storing a processor executable code, which when executed by at least one processor which is provided in a focus adjustment device in an imaging apparatus, performs a focus adjustment method, the imaging apparatus having an image sensor with plurality of photodiodes that have been divided in a given pupil-division direction, for a single microlens, and that generates a pixel signal by subjecting respective light fluxes that have passed through different exit pupil regions of an imaging optical system to photoelectric conversion, the focus adjusting method comprising alternately and repeatedly switching between a first imaging operation of generating and outputting a pixel signal resulting from having combined pixel signals corresponding to the pupil-division direction, and a second imaging operation of generating and outputting a pixel signal corresponding to the pupil-division direction, during rapid shooting of still pictures, executing focus control to display image data based on a pixel signal output as a result of the first imaging operation from the image sensor, or perform processing for storage as a still picture, and generate focus adjustment data by performing focus detection based on a pixel signal output as a result of the second imaging operation, and computing focus movement amount based on the focus adjustment data, and if the focus movement amount is larger than a predetermined value, and focus control based on the focus movement amount and the first imaging operation are executed in parallel, prohibiting processing for storage as a still picture on image data based on a pixel signal of the first imaging operation.

BRIEF DESCRIPTION OF THE DRAWINGS

FIG. 13A and FIG. 13B are flowcharts showing operation at the time of still picture rapid shooting, in the imaging device of one embodiment of the present invention.

DETAILED DESCRIPTION OF THE PREFERRED EMBODIMENTS

An imaging device of one embodiment of the present invention will be described in the following. This imaging device has an imaging section, with this imaging section converting a subject image to image data, and the subject image being subjected to live view display on a display section arranged on the rear surface of the camera body based on this converted image data. A photographer determines composition and photo opportunity by looking at the live view display. If the photographer operates a release button, image data is stored in a storage medium. A stored image based on image data that has been stored in the storage medium is subjected to playback display on the display section if the photographer has selected playback mode.

Also, the imaging section of the imaging device of this embodiment has focus detection pixels arranged within a two-dimensional array of imaging pixels, and a subject image that has been formed by an imaging optical system is imaged. When shooting still pictures using rapid shooting, exposure for phase difference detection is performed between one actual exposure and another actual exposure for still picture shooting (refer, for example, to FIG. 5). After completion of this exposure for phase difference detection, a signal from phase difference detection pixels (focus detection pixels) is read out (refer, for example, to S43 in FIG. 13B), correlation calculation and focus deviation amounts are calculated using the pixel signal that has been read out, and focusing of a focus lens is performed (refer, for example, to S45, S47, S53 and S55 in FIG. 13B).

Also, the imaging device of this embodiment determines whether or not subject has changed significantly, whether or not the subject is moving etc., and whether movement velocity is extremely small, based on result of correlation calculation and on focus deviation amount etc., and selects a drive method for the focus lens, such as absolute drive (refer to FIG. 8 and S87 etc. in FIG. 14.), scan drive (refer to FIG. 9, FIG. 10, and S81 etc. in FIG. 14), or relative drive (refer to FIG. 11, FIG. 12, and S83 etc. in FIG. 14), etc., based on the result of these determinations. Also, storage of still pictures is prohibited in a case where focus movement amount etc. satisfies specified conditions (refer to FIG. 15 and FIG. 16 etc.).

Figure 1:
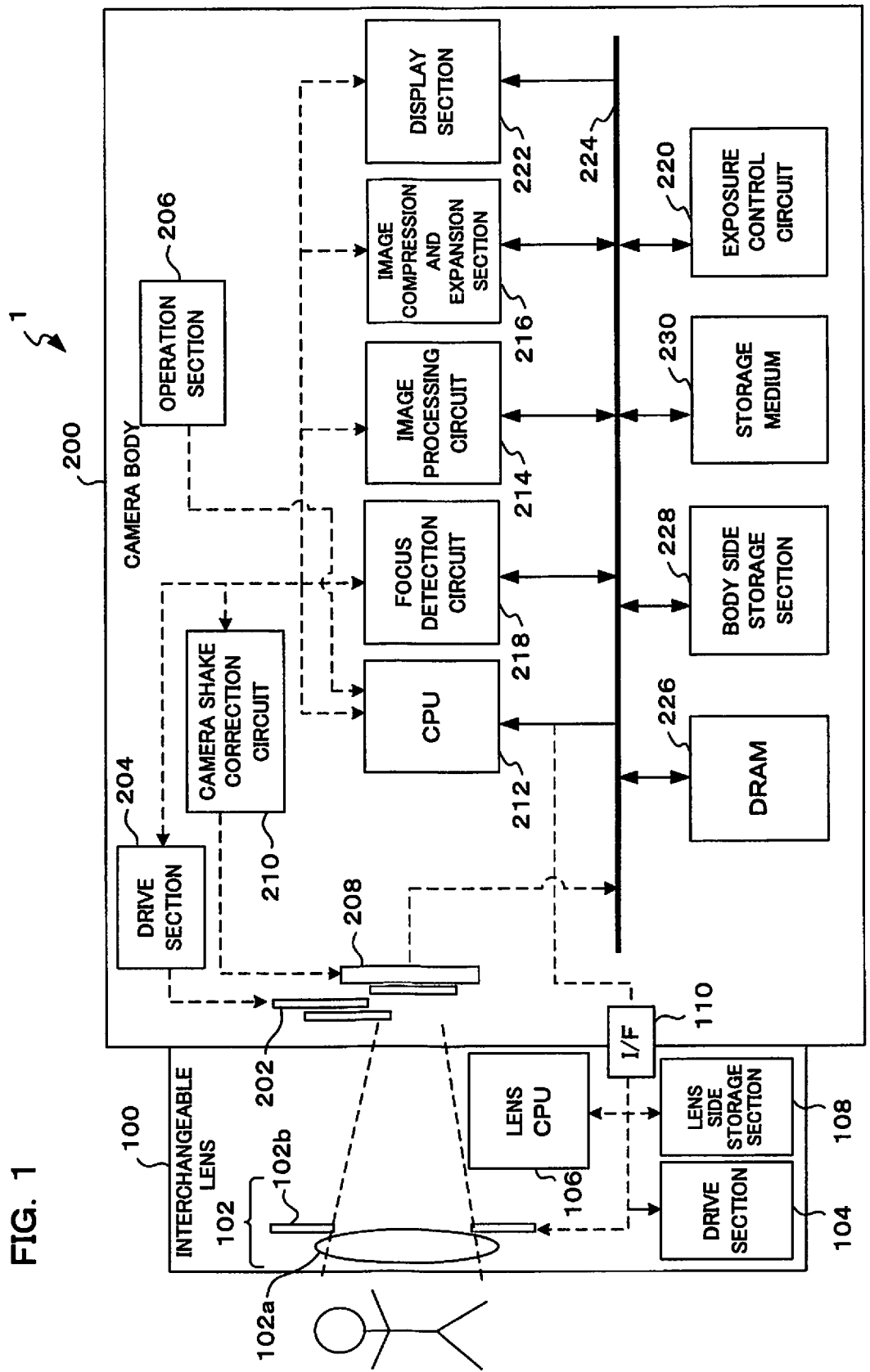
FIG. 1 is a block diagram mainly showing the electrical structure of an imaging device of one embodiment of the present invention.

FIG. 1 is a block diagram showing one example of the structure of an imaging device (specifically, a digital camera, for example) 1 that includes a focus detection device of one embodiment of the present invention. It should be noted that in FIG. 1 solid line arrows show flow of data, and dashed line arrows show flow of control signals.

An imaging device 1 comprises an interchangeable lens 100 and a camera body 200. The interchangeable lens 100 is configured so that it is possible to attach to the camera body 200. When the interchangeable lens 100 is attached to the camera body 200, the interchangeable lens 100 and the camera body 200 are connected so that communication is possible between them. It should be noted that the imaging device 1 is not necessarily a lens interchangeable imaging device. For example, the imaging device 1 may be a lens integrated imaging device. The imaging device may also be provided within a portable device, such as a smart phone.

The interchangeable lens 100 comprises an imaging optical system 102, a drive section 104, a lens CPU (Central Processing Unit) 106, and a lens side storage section 108. Here, each block of the interchangeable lens 100 is configured using hardware, for example. However, the configuration does not necessarily have to use hardware, and some sections may be configured using software. Also, each block of the interchangeable lens 100 need not be configured using a single hardware or software component, and may be configured using a plurality of hardware or software components. Also, in a case where the interchangeable lens 100 and the camera body 200 are integrated, the lens CPU 106 and the CPU 212 may be configured as a single CPU.

The imaging optical system 102 is an optical system imaging light flux from a subject onto the image sensor 208 of the camera body 200. The imaging optical system 102 comprises a focus lens 102a and an aperture 102b. The focus lens 102a is constructed so as to be able to adjust focal position of the imaging optical system 102 by moving in an optical axis direction.

The aperture 102b is arranged on the optical axis of the focus lens 102a. The opening diameter of the aperture 102b is variable. The aperture 102b adjusts amount of light flux from a subject passing through the focus lens 102a that is incident on the image sensor 208. The drive section 104 has a drive motor and a drive circuit etc., and drives the focus lens 102a and the aperture 102b based on control signals output from the lens CPU 106. Here, the imaging optical system 102 may be configured as a zoom lens that changes focal length. In this case, the drive section 104 may also perform zoom drive, and focal length may also be changed by manual operation of the user. The drive section 104 functions as an actuator (aperture drive section, driver) for driving the aperture that is included in the imaging optical system.

The lens CPU 106 is a processor that includes a CPU and peripheral circuits for the CPU, and operates in accordance with programs stored in a lens side storage section 108. The lens CPU 106 is configured so as to be able to communicate with the CPU 212 of the camera body 200 via an interface (I/F) 110. The lens CPU 106 controls the drive section 104 in accordance with control signals from the CPU 212 of the camera body 200. Also, the lens CPU 106 transmits various information, such as aperture value (F value) of the aperture 102b, and lens information etc. stored in the lens side storage section 108, to the CPU 212 via the I/F 110. The lens CPU 106 functions as a focus lens processor (focus lens control section) that controls position of the focus lens contained in the imaging optical system. This focus lens processor (focus lens control section) communicates with a processor (a control section) to execute position control of the focus lens in synchronization with a first imaging operation and second imaging operation of the image sensor (refer to FIG. 7 to FIG. 12).

It should be noted that the lens CPU 106 is not necessarily configured as a CPU. That is, functions that are the same as those of the lens CPU 106 may also be implemented using a processor such as an ASIC (Application Specific Integrated Circuit) or FPGA (Field-Programmable Gate Array) etc. Also, functions that are the same as those of the lens CPU 106 may also be implemented using software.

The lens side storage section 108 is an electrically rewritable nonvolatile memory, and stores lens information etc. relating to the interchangeable lens 100 as well as the above described programs. Lens information includes, for example, information focal length information and aberration information of the imaging optical system 102.

The camera body 200 comprises a mechanical shutter 202, a drive section 204, an operation section 206, the image sensor 208, a hand shake correction circuit 210, the CPU 212, an image processing circuit 214, an image compression and expansion section 216, a focus detection circuit 218, an exposure control circuit 220, a display section 222, a bus 224, DRAM (Dynamic Random Access Memory) 226, a body side storage section 228, and a storage medium 230. Here, each block of the camera body 200 is configured using hardware, for example. However, the configuration does not necessarily have to use hardware, and some sections may be configured using software. Also, each block of the camera body 200 need not be configured using a single hardware or software component, and may be configured using a plurality of hardware or software components.

The mechanical shutter 202 has an opening and closing structure, and adjusts a time for which light flux from the subject is incident on the image sensor 208 (exposure time of the image sensor 208). A focal plane shutter, for example, is adopted as the mechanical shutter 202. Besides this focal plane shutter, a lens shutter may be provided at the lens barrel side. The drive section 204 drives the mechanical shutter 202 based on control signals from the CPU 212. The drive section 204 comprises an actuator that drives the mechanical shutter 202, and drive circuits etc. for driving this actuator, and performs opening and closing operations of the mechanical shutter 202.

The operation section 206 is an interface for inputting user instructions to the imaging device 1, and includes various operation members such as various operation buttons like a power supply button, release button, movie button, mode dial, playback button, menu button, etc. and a touch panel etc. This operation section 206 detects operating state of the various operation members, and outputs signals representing detection results to the CPU 212.

The image sensor 208 is arranged on the optical axis of the imaging optical system 102, at a position that is behind the mechanical shutter 202, and where light flux from a subject is formed into an image by the imaging optical system 102. The image sensor 208 generates a pixel signal relating to a subject that has been formed into an image.

The image sensor 208 has a pixel section 22 (refer to FIG. 2) with a plurality of imaging pixels arranged two-dimensionally. Imaging pixels are constructed divided into a plurality of focus detection pixels, corresponding to a microlens Le (refer to FIG. 3). The focus detection pixels generate photoelectric conversion signals by respectively subjecting light flux, that passes through regions resulting from subjecting a plurality of exit pupils of an imaging lens 2, which is an imaging optical system, to pupil-division, to photoelectric conversion. A plurality of focus detection pixels are arranged two dimensionally in the pixel section 22. While the image sensor 208 is constructed as a single CMOS image sensor provided with a primary color Bayer array color filter, this structure is not limiting. The detailed structure of the image sensor 208 will be described later using FIG. 2 to FIG. 4.

Each pixel section of the image sensor 208 has a plurality of photo-diodes arranged divided in a given pupil division direction, for a single micro-lens, so that a pixel signal is generated by subjecting respective light flux, that passes through different exit pupil regions of an imaging optical system, to photoelectric conversion. The image sensor 208 also has a pixel section in which a plurality of light receiving sections are arranged divided in a given pupil division direction, for a single micro-lens, so that a pixel signal is generated by subjecting respective light flux, that passes through different exit pupil regions of an imaging optical system, to photoelectric conversion.

At the time of readout of pixel signals from pixel sections of this image sensor 208, there are a first imaging operation to generate and output a pixel signal resulting from combining pixel signals corresponding to a pupil-division direction, and a second imaging operation for generating and outputting pixel signals corresponding to the pupil-division direction. The image sensor 208 is therefore capable of being set to an imaging mode to alternately and repeatedly execute the first imaging operation and the second imaging operation.

The first imaging operation combines (for example, adds) a plurality of pixel signals that have been acquired using a plurality of photodiodes that have been divided in the pupil-division direction. Pixel signals that have been acquired by this first imaging operation are used when generating a still picture for live view display and for storage. The second imaging operation individually outputs a plurality of pixel signals that have been acquired using a plurality of photodiodes that have been divided in the pupil-division direction. For example, in the case of a 2PD pixel structure, which will be described later, a left side opening signal (L signal) and a right side opening signal (R signal) resulting from pupil-division are respectively output. Pixel signals that have been acquired using these two imaging operations are used at the time of focus detection using phase difference AF. It should be noted that as the second imaging operation it is also possible to obtain an opening signal for either of a left side or right side opening signal, and to obtain the other opening signal by acquiring a summed signal of left side and right side opening signals and subtracting the opening signal from the summed signal. In any event the second imaging operation only has to be able to acquire a signal phase difference detection.

The image sensor 208 has a plurality of photo-diodes arranged divided in a specified pupil division direction, for a single microlens, and generates a pixel signal by subjecting respective light flux, that passes through different exit pupil regions of the imaging optical system, to photoelectric conversion, Also, the image sensor 208 is capable of setting an imaging mode that alternately and repeatedly switches between a first imaging operation in which a pixel signal resulting from combining pixels signals corresponding to the pupil-division direction is generated and output, and a second imaging operation in which a pixel signal corresponding to the pupil-division direction is generated and output.

The hand shake correction circuit 210 moves the image sensor 208 in directions parallel to the light receiving surface of the image sensor, so as to suppress camera shake that has been generated in the camera body 200. By moving the image sensor 208 so as to negate camera shake movement, blurring of the subject image occurring in image data that is attributable to camera shake is suppressed. It should be noted that the camera shake correction circuit may be provided in the interchangeable lens 100. A camera shake correction circuit in this case is configured so as to move a camera shake correction optical system that is included in the imaging optical system 102.

The CPU 212 is a processor that includes a CPU and peripheral circuits for the CPU, and performs overall control of the camera body 200 in accordance with programs stored in a body side storage section 228. The CPU 212 controls imaging operations (imaging drive mode, readout mode etc.) by the image sensor 208, for example. Also, the CPU 212 outputs control signals for driving the focus lens 102*a* to the lens CPU 106, in accordance with focus state of the focus lens 102*a* that has been detected by the focus detection circuit 218. The CPU 212 also outputs exposure setting values that have been calculated by the exposure control circuit 220 to the lens CPU 106 and the image sensor 208. Here, the CPU 212 is not necessarily configured as a CPU. Specifically, functions that are the same as those of the CPU 212 may also be implemented using an ASIC or FPGA etc. Also, functions that are the same as those of the CPU 212 may also be implemented using software.

Figure 7:
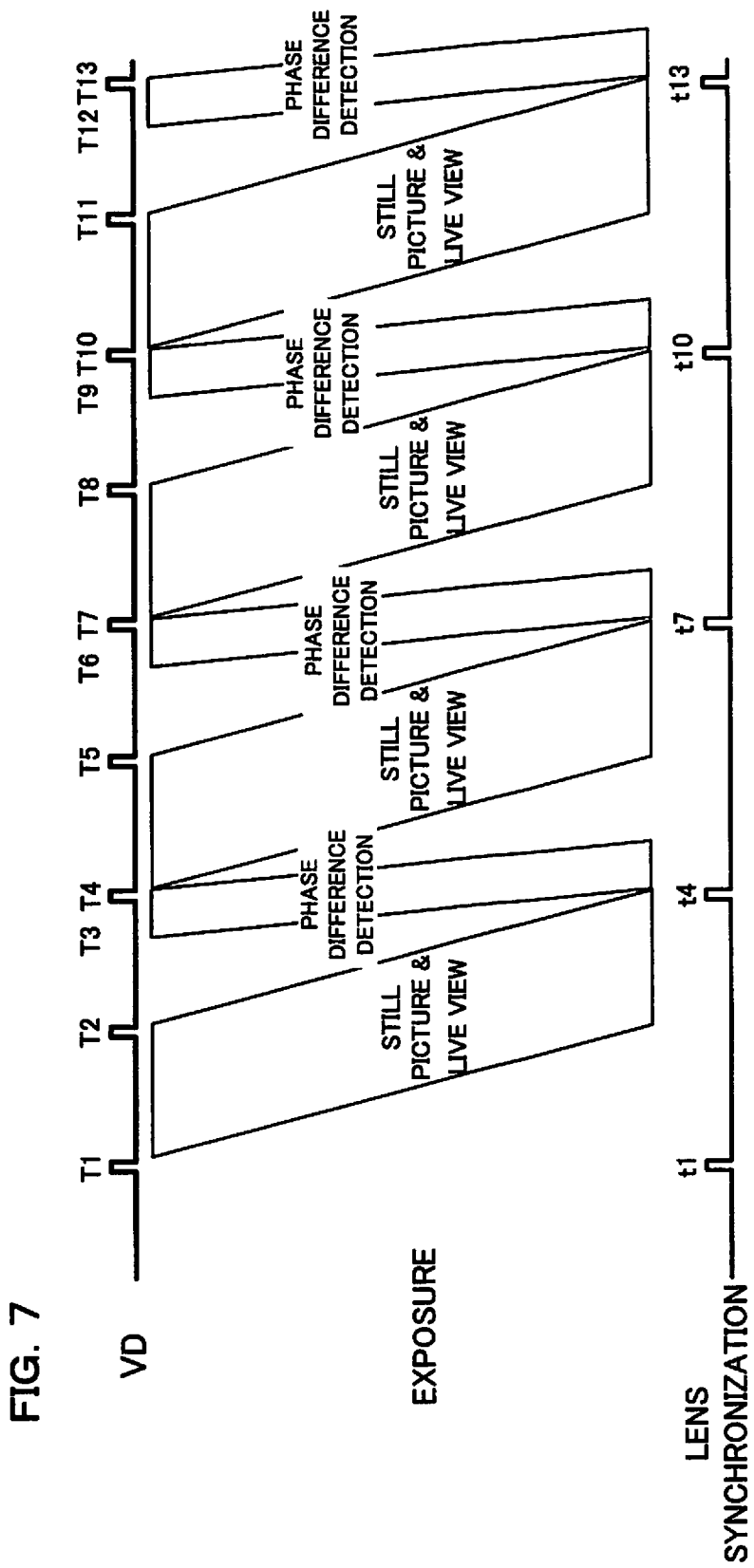
FIG. 7 is a timing chart showing a lens synchronization signal at the time of still picture rapid shooting, in the imaging device of one embodiment of the present invention.

The CPU 212 fulfills functions as a processor (control section) that, during rapid shooting of still pictures, executes focus control to display images based on a pixel signal output as a result of the first imaging operation from the image sensor, or perform processing for storage as a still picture, and generate focus adjustment data by performing focus detection based on a pixel signal output as a result of the second imaging operation (refer to FIG. 7, for example). Also, the above described processor (control section) computes focus movement amount based on the focus adjustment data, and if the focus movement amount is larger than a predetermined value, and focus control based on the focus movement amount and the first imaging operation are executed in parallel, prohibits processing for storage of image data as a still picture based on a pixel signal of the first imaging operation (refer, for example, to absolute drive in FIG. 8, S87 in FIG. 14, and S95 in FIG. 16 and FIG. 15).

Figure 16:
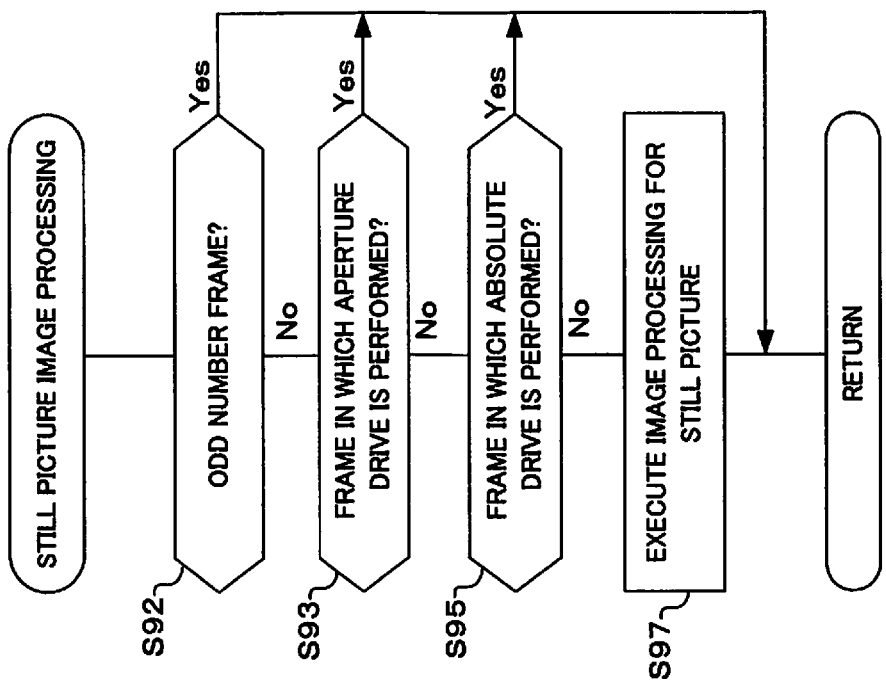
FIG. 16 is a flowchart showing a modified example of operation of still picture image processing, in the imaging device of one embodiment of the present invention.
Figure 15:
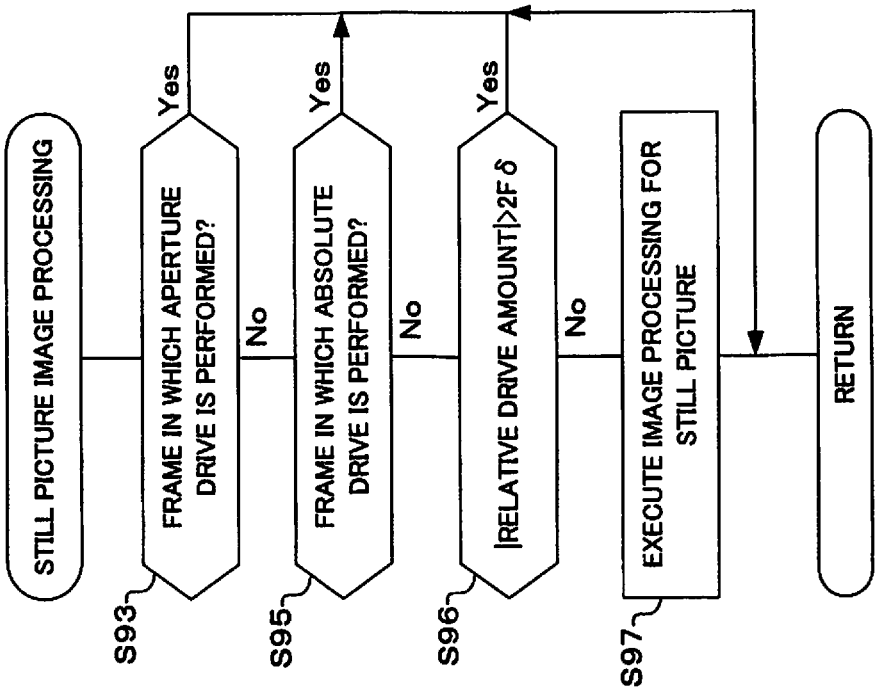
FIG. 15 is a flowchart showing operation of still picture image processing, in the imaging device of one embodiment of the present invention.

Also, the processor (control section) computes focus movement amount based on the focus adjustment data, and if the focus movement amount is larger than a predetermined value, and focus control based on the focus movement amount and the first imaging operation are executed in parallel, or if the first imaging operation is executed in parallel during aperture drive, prohibits processing for storage of image data as a still picture based on a pixel signal of the first imaging operation (refer, for example, to S55 in FIG. 13B, S93 Yes in FIG. 15, and S93 Yes, FIG. 16).

Figure 8:
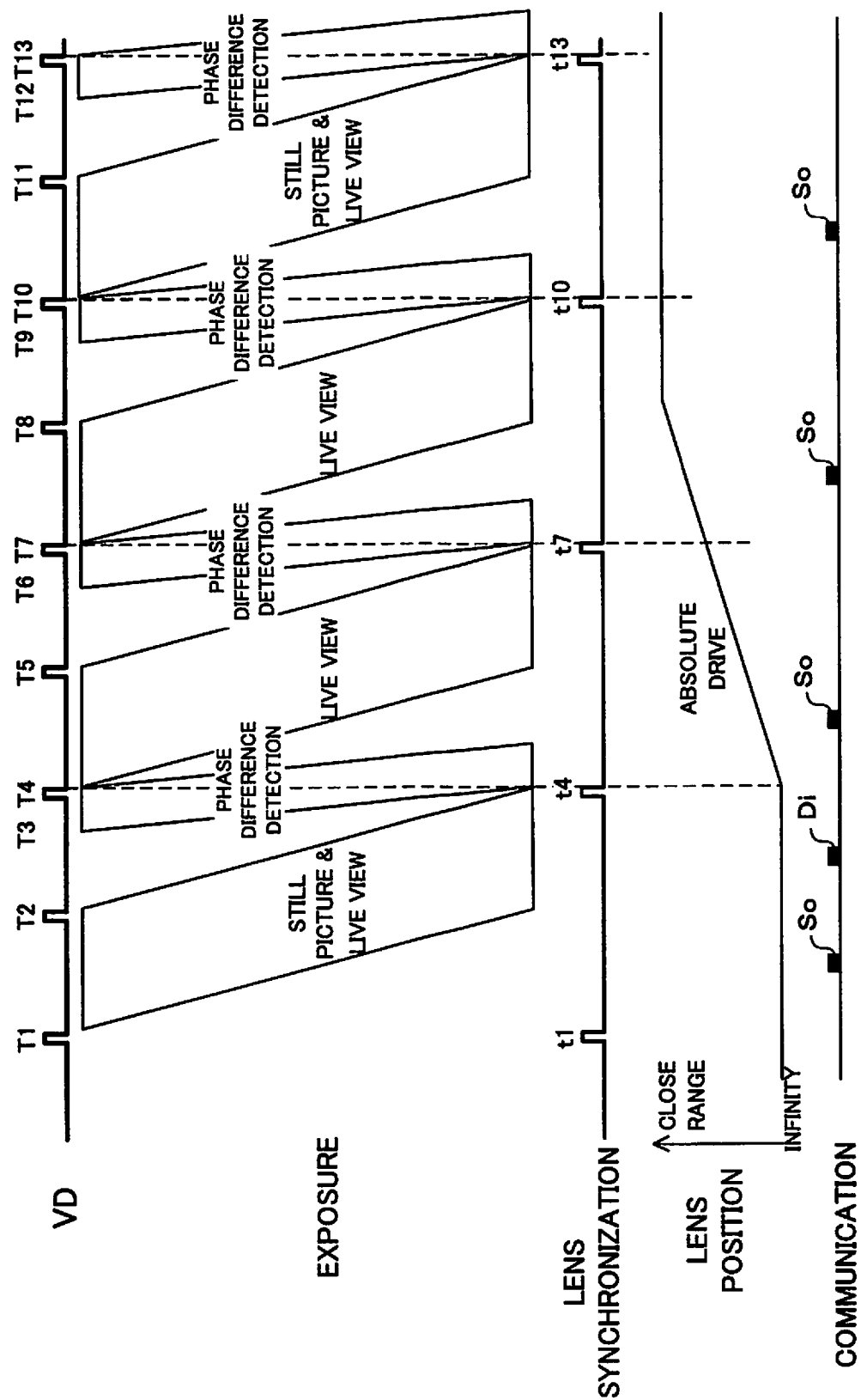
FIG. 8 is a timing chart showing operation in a case of absolute drive of a focus lens, at the time of still picture rapid shooting, in the imaging device of one embodiment of the present invention.

The above described processor (control section) executes processing for performing display of image data based on a pixel signal of the first imaging operation, regardless of focus movement amount (refer, for example, to absolute drive in FIG. 8). The processor (control section) described above determines whether or not to execute the focus control in parallel with the first imaging operation based on the focus adjustment data, and if the focus control is executed in parallel with a current first imaging operation, among first imaging operations that are repeatedly executed, does not execute the focus control in parallel with the next first imaging operation (refer, for example, to FIG. 11 and S83 in FIG. 14).

Figure 12:
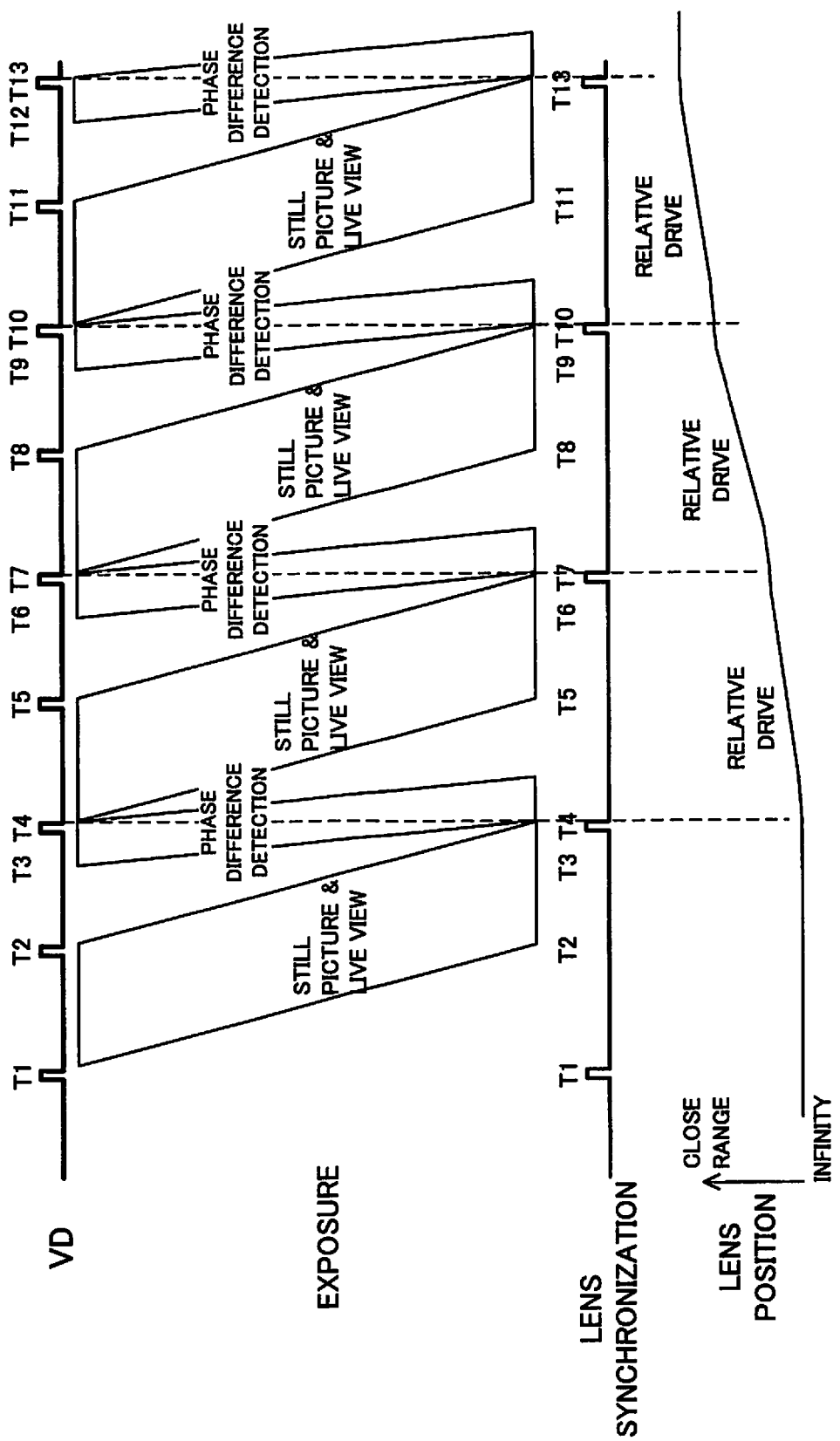
FIG. 12 is a timing chart showing operation of a modified example, in a case of relative drive of a focus lens, at the time of still picture rapid shooting, in the imaging device of one embodiment of the present invention.

The processor (control section) described above performs focus control by restricting change amount of defocus amount to less than a predetermined value, in the event that focus control is executed in parallel with the first imaging operation that is repeatedly executed (refer, for example, to FIG. 12 and S96 in FIG. 16). The above described processor (control section) calculates image plane movement velocity corresponding to a subject based on a plurality of focus adjustment data, and performs focus control based on the image plane movement velocity that has been calculated (refer to FIG. 12, for example).

The image processing circuit 214 applies various image processing to pixel data. For example, at the time of still picture shooting (also including rapid shooting), the image processing circuit 214 applies image processing for still picture storage and generates still picture data. Similarly, at the time of movie shooting, the image processing circuit 214 applies image processing for movie storage and generates movie data. Further, at the time of live view display the image processing circuit 214 applies image processing for display and generates display image data.

The image compression and expansion section 216 has an image compression circuit and an image expansion circuit. At the time of image data storage, the image compression and expansion section 216 compresses image data that has been generated by the image processing circuit 214 (still picture data or movie data). Also, at the time of image data playback, image data that is stored in the storage medium 230 in a compressed state is expanded.

The focus detection circuit 218 performs focus detection for the focus lens 102a using a phase difference method that uses focus detection pixel data output from the focus detection pixels of the image sensor 208 (refer, for example, to S7, S9 S19 and S21 in FIG. 13A, and S45 and S47 in FIG. 13B, etc., which will be described later).

The exposure control circuit 220 fulfills a function as a photometry section, and calculates exposure setting values based on pixel data of the image sensor 208. This exposure control circuit 220 measures subject brightness from pixel data of the image sensor 208, and calculates exposure setting values necessary to make brightness of the subject at the time of shooting a correct value, from the subject brightness that has been measured. Exposure setting values include opening amount of the aperture 102b (aperture value) and exposure time of the image sensor 208 (shutter speed).

The display section 222 has a display such as a liquid crystal display or an organic EL display, and is arranged on a rear surface etc. of the camera body 200, or is arranged as an electronic viewfinder. This display section 222 displays images in accordance with control by the CPU 212. The display section 222 is used in live view display and playback display of already stored images etc.

The bus 224 is connected to the image sensor 208, CPU 212, image processing circuit 214, image compression and expansion section 216, focus detection circuit 218, exposure control circuit 220, display section 222, DRAM 226, body side storage section 228 and storage medium 230, and operates as a transfer circuit for transferring various data that has been generated by these blocks.

The DRAM 226 is an electrically rewritable volatile memory, and temporarily stores various data such as pixel data output from the image sensor 208, still picture data, movie data, display image data, and process data for the CPU 212 etc. It should be noted that it is also possible to use an SDRAM (synchronous dynamic random access memory) as temporary storage.

The body side storage section 228 is an electrically rewritable non-volatile memory. The body side storage section 228 stores various data such as programs used by the CPU 212 and adjustment values for the camera body 200 etc. The storage medium 230 is an electrically rewritable non-volatile memory, and is built into the camera body 200 or configured to be loaded into the camera body 200. The storage medium 230 stores image data for storage as an image file of a specified format. It should be noted that the DRAM 226, body side storage section 228, and storage medium 230 may be respectively configured as a single memory, or may be configured as a combination of a plurality of memories etc.

Next, the structure of the image sensor 208 will be described using FIG. 2. The image sensor 208 has image pixels, and these image pixels are divided into a plurality of focus detection pixels. Image pixels generate an image pixel signal and a focus detection pixel signal based on a photoelectric conversion signal that has been generated by photoelectric conversion of light flux by focus detection pixels. It should be noted that image pixels of this embodiment use photodiodes, as will be described later.

Figure 2:
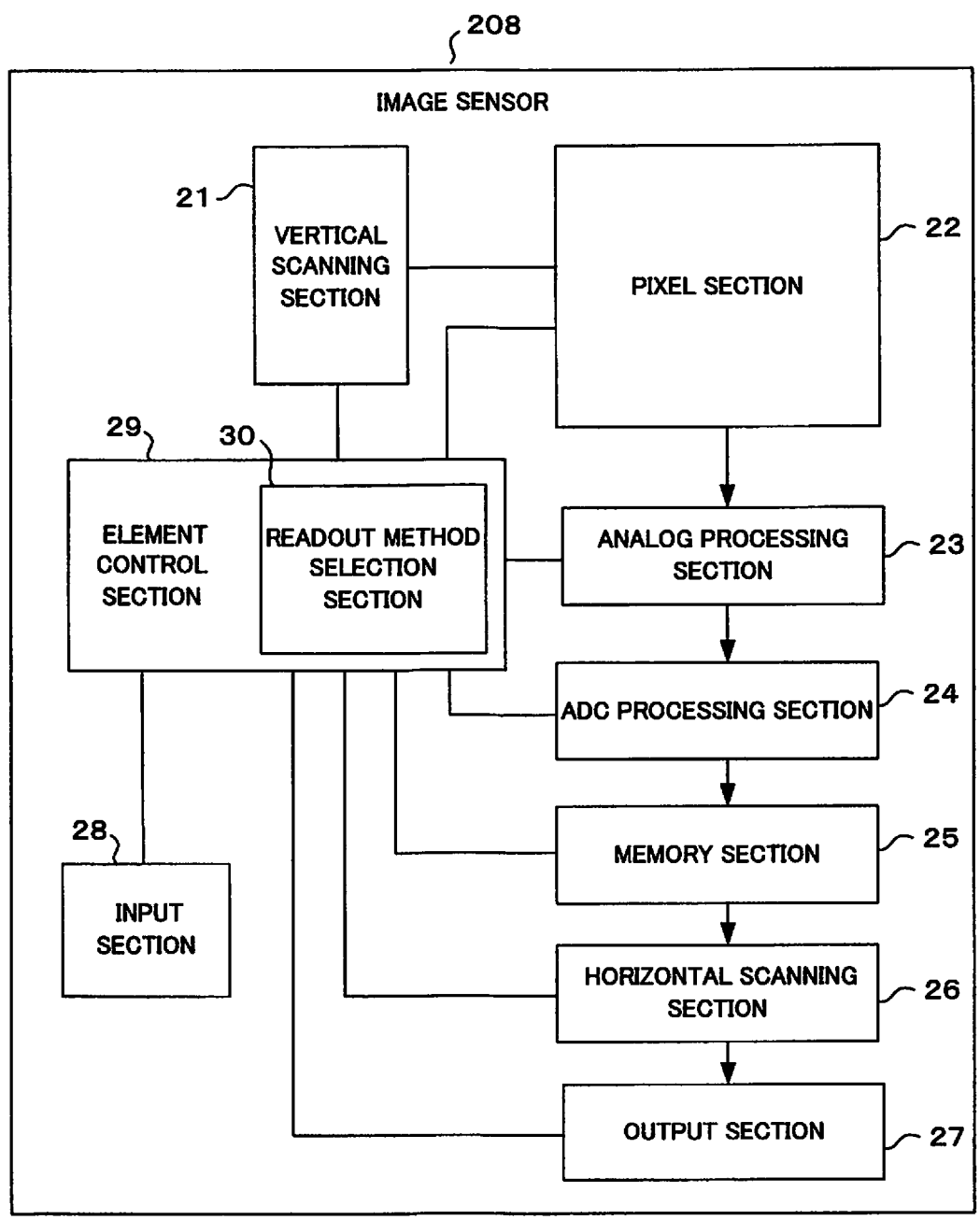
FIG. 2 is a block diagram mainly showing the electrical structure of an image sensor of an imaging device of one embodiment of the present invention.

In the example shown in FIG. 2, the image sensor 208 comprises a vertical scanning section 21, a pixel section 22, an analog processing section 23, an ADC processing section 24, memory section 25, horizontal scanning section 26, output section 27, input section 28, and element control section 29.

Image pixels and focus detection pixels are arranged in the pixel section 22. The image pixel signals and focus detection pixel signals are generated by photoelectric conversion of a subject image, and readout of these signals that have been generated is performed by at least one section among the vertical scanning section 21 to output section 27, and the element control section 29 etc. Structure of each pixel arranged in the pixel section 22 will be described later using FIG. 3 and FIG. 4.

The vertical scanning section 21 has a vertical scanning circuit, and performs scanning in a vertical direction by successively selecting pixel rows (lines) in a horizontal direction within the pixel section 22. This vertical scanning section 21 selects a particular line, and controls charge accumulation time of pixels (exposure time) by performing resetting and transfer of each pixel of the line that has been selected.

The analog processing section 23 has an analog processing circuit, and is a circuit for subjecting an analog pixel signal that has been read out from the pixel section 22 to analog signal processing. This analog processing section 23 includes, for example, a preamp that amplifies the pixel signal, and a correlated double sampling (CDS) circuit that subtracts reset noise from the pixel signal, etc.

The analog digital conversion processing section (ADC processing section) 24 has an A/D conversion circuit, and converts the analog pixel signal that has been output from the analog processing section 23 to digital pixel data. This ADC processing section 24 adopts a structure, such as exemplified by camera ADC, for example, whereby a pixel signal that has been read out from the pixel section 22 is subjected to AD conversion by an analog to digital converter (ADC) for every line.

The memory section 25 has a memory, and is configured by an electrically rewritable volatile memory circuit etc. that temporarily holds pixel data that has been converted by the ADC processing section 24. The horizontal scanning section 26 has a horizontal scanning circuit, and reads out pixel data (image pixel data and focus detection pixel data) from the memory section 25 in successive rows.

The output section 27 has an output circuit, and has pixel signal that have been read out from the horizontal scanning section 26 arranged to generate pixel signal rows, converts to an output signal format such as a serial signal or differential signal etc. and outputs the converted result. It should be noted that this output section 27 or the above described ADC processing section 24 etc. function as a sensitization section that performs sensitization processing (signal amplification processing in accordance with ISO sensitivity that has been set).

The input section 28 has an input circuit, and receives synchronization signals, a reference clock, and operation setting information etc. relating to control of the image sensor 208 from the CPU 212 and a not-illustrated image sensor drive section.

The element control section 29 has an imaging control circuit, and is for controlling each block within the image sensor 208 in conformity with synchronization signals and a reference clock that have been received via the input section 28, and is provided with a readout method selection section 30. Also, the element control section 29 receives operation setting instructions, such as instructions for switching imaging drive mode, from the CPU 212 via the input section 28, and controls each block within the image sensor 208.

The readout method selection section 30 has a selection circuit, and selects and sets a readout method for readout from the image sensor 208 based on operation setting information (for example, camera modes such as still picture shooting, movie shooting, live view, AF etc.) that has been received via the input section 28. As a readout method, all or some of first readout (simple readout method), second readout (subtractive readout method), and third readout for reading out addition values of focus detection pixels (readout method without phase difference information) may be set. First readout is generation and readout of both of a pair of focus detection pixel signals for a first pupil-division direction, based on the photoelectric conversion signal. Also, second readout is generation of one of a pair of focus detection pixel signals for a second pupil-division direction based on a photoelectric conversion signal, together with generation of an image pixel signal by addition of all photoelectric conversion signals that have been generated within a single image pixel, and reading out the one focus detection pixel signal that has been generated and the image pixel signal. Further, the third readout is generation of an image pixel signal by addition of all photoelectric conversion signals that have been generated within a single image pixel, and reading out the image pixel signal that has been generated.

Whichever method is used, with this embodiment a combined signal for live view display and for still picture storage, and individual focus detection pixels signals for phase difference detection, are acquired. The element control section 29 controls each section within the image sensor 208 in accordance with a readout method that has been set by the readout method selection section 30. A control section that controls readout of the image sensor is configured by the element control section 29 and the CPU 212 that was shown in FIG. 1.

It should be noted that in FIG. 2 a structural example is shown in which the image sensor 208 is not only provided with the vertical scanning section 21 and the pixel section 22, but is also provided with the analog processing section 23 to element control section 29. However, the structure of the image sensor 208 is not thus limited, and it is possible for one or more of the analog processing section 23 to element control section 29, for example, to be arranged externally to the image sensor 208.

Next, the structure of the focus detection pixels and image pixels arranged in the pixel section 22 will be described using FIG. 3 and FIG. 4. As has been described above, the pixel section 22 is a pixel array section having image pixels and focus detection pixels arranged two dimensionally (for example, in the vertical direction (column direction) and horizontal direction (line direction)).

Figure 3:
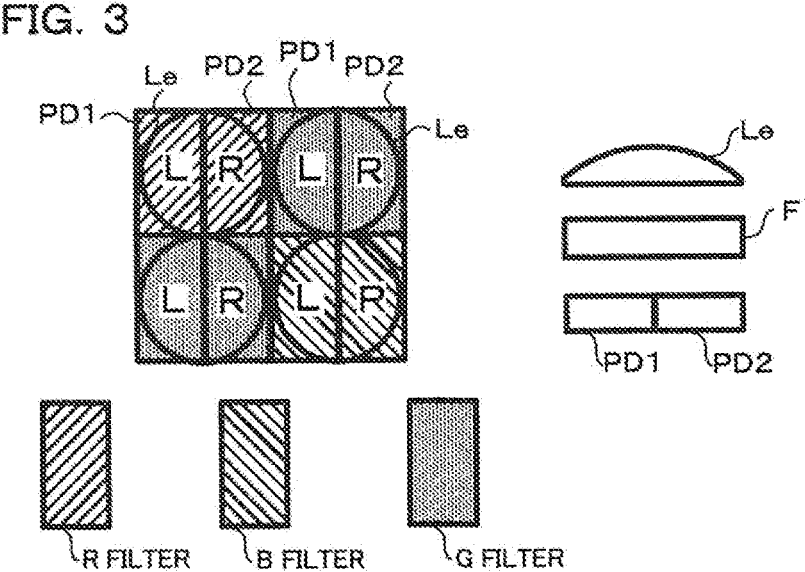
FIG. 3 is a block diagram showing the structure of a 2PD pixel type pixel, in the imaging device relating to one embodiment of the present invention.

FIG. 3 shows an example of a 2PD pixel structure, and this 2PD structure is a pixel structure having two photodiodes PD arranged in a single microlens Le. The 2PD pixel structure shown in FIG. 3 has a single color filter F and two photodiodes PD1 and PD2 arranged for a single microlens Le, as shown in the plan drawing on the left. Each pixel is configured with a microlens Le, color filter F and photodiodes PD1 and PD2 arranged sequentially in a lamination direction facing from an object side to an image side, as shown in the cross sectional drawing on the right side of FIG. 3. Here, the microlens Le is for increasing light amount reaching the image pixels by concentrating light, and effectively making a numerical aperture of the image pixels large. Also, regarding the color filter F, in a case, for example, of a primary color Bayer array color filter, either of a red (R) filter, green (G) filter or blue (B) filter is provided in accordance with that pixel position.

In the case of the 2PD pixel structure shown in FIG. 3, photodiodes PD1 and PD2 are arranged in the imaging range of a single microlens Le, in the pupil-division direction. The two photodiodes PD are divided into left and right in the case where phase difference in the horizontal direction is detected, and divided into top and bottom in the case where phase difference in the vertical direction is detected. As a result, a single pixel has two focus detection pixels. In the plan view shown on the left side of FIG. 3, photodiode PD1 that receives light flux L that has passed through the left side of the photographing lens, and photodiode PD2 that receives light flux R that has passed through the right side of the photographing lens, are arranged.

Next, a 4PD pixel structure will be described using FIG. 4. Similarly to the case of FIG. 3, the 4PD pixel structure pixel section 22 is a pixel array section having image pixels and focus detection pixels arranged two dimensionally (for example, in the vertical direction (column direction) and horizontal direction (line direction)). In a case of the 4PD pixel structure, four photodiodes PD are arranged in the imaging range of a single microlens Le. Also, similarly to the case of FIG. 3, color filters F are arranged between the microlens Le and the 4 photodiodes. In a case, for example, of a primary color Bayer array color filter, the color filters F are arranged with either of a red (R) filter, green (G) filter or blue (B) filter provided in accordance with that pixel position.

The four photodiodes PD are divided into four, namely left, right, top, and bottom, so that it is possible to detect phase difference in the horizontal direction and in the vertical direction. Specifically, the four photo diodes PD are respectively arranged at upper left, lower left, upper right, and lower right positions. With this structure, a single pixel has four photodiodes PDa, PDb, PDc and PDd. In this case, there are two pupil-division directions, namely the horizontal direction and the vertical direction.

Figure 4:
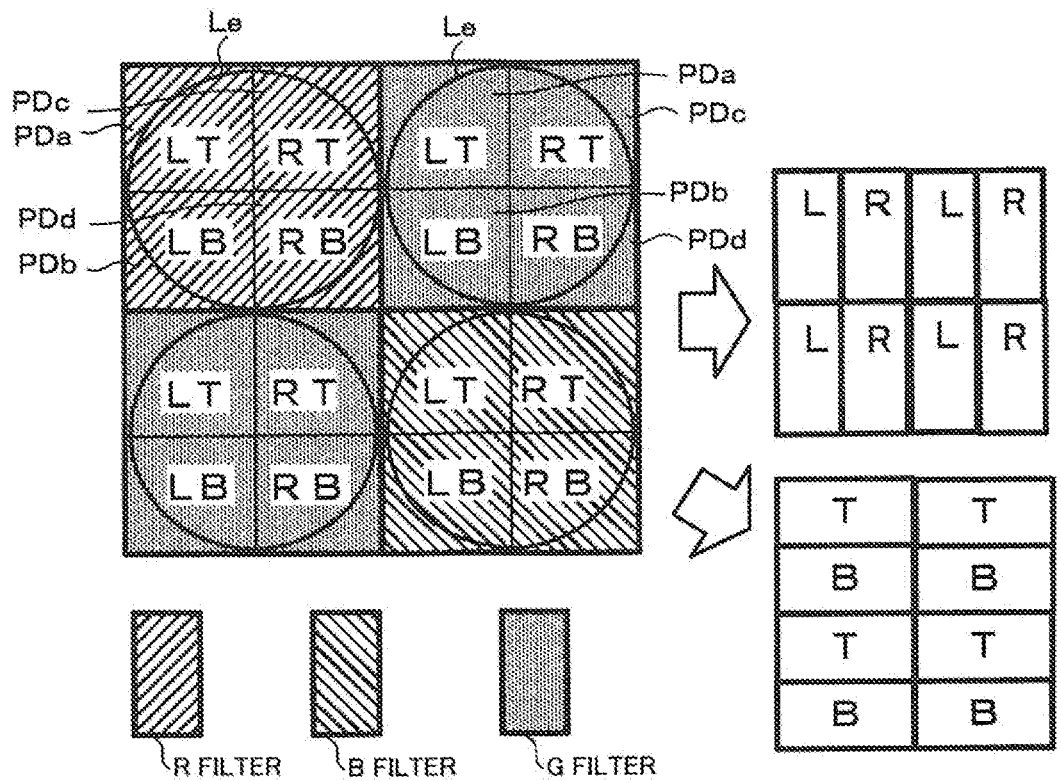
FIG. 4 is a block diagram showing the structure of a 4PD pixel type pixel, in the imaging device relating to one embodiment of the present invention.

Further, in a case where outputs of photodiodes PD are subjected to vertical two pixel addition, namely, in a case where (PDa+PDb) and (PDc+PDd) in FIG. 4 are calculated, this will constitute focus detection pixel signals for detecting phase difference in the horizontal direction (vertical line detection). As a result, as shown at the upper right of FIG. 4, a left side two-pixel addition value L and a right side two-pixel addition value R are obtained. Also, in a case where outputs of photodiodes PD are similarly subjected to horizontal two pixel addition, namely, in a case where (PDa+PDc) and (PDb+PDd) are calculated, this will constitute focus detection pixel signals for detecting phase difference in the vertical direction (horizontal line detection). In this case, as shown at the bottom of FIG. 4, an upper two-pixel addition value and a lower two-pixel addition value are obtained.

In the case of the 4PD pixel structure shown in FIG. 4, of the focus detection pixel signals for vertical line detection and the focus detection pixel signals for horizontal line detection, one pair constitute a pair of focus detection pixel signals for a first pupil-division direction, and the other pair constitute a pair of focus detection pixel signals for a second pupil-division direction. In addition, in a case where outputs of photodiodes PD are similarly subjected to four pixel addition, namely in the case where (PDa+PDb+PDc+PDd) is calculated, an image pixel signal results. With this embodiment, with both the 2PD pixel structure and with the 4PD pixel structure it is possible to adopt either PD pixel structure.

Figure 5:
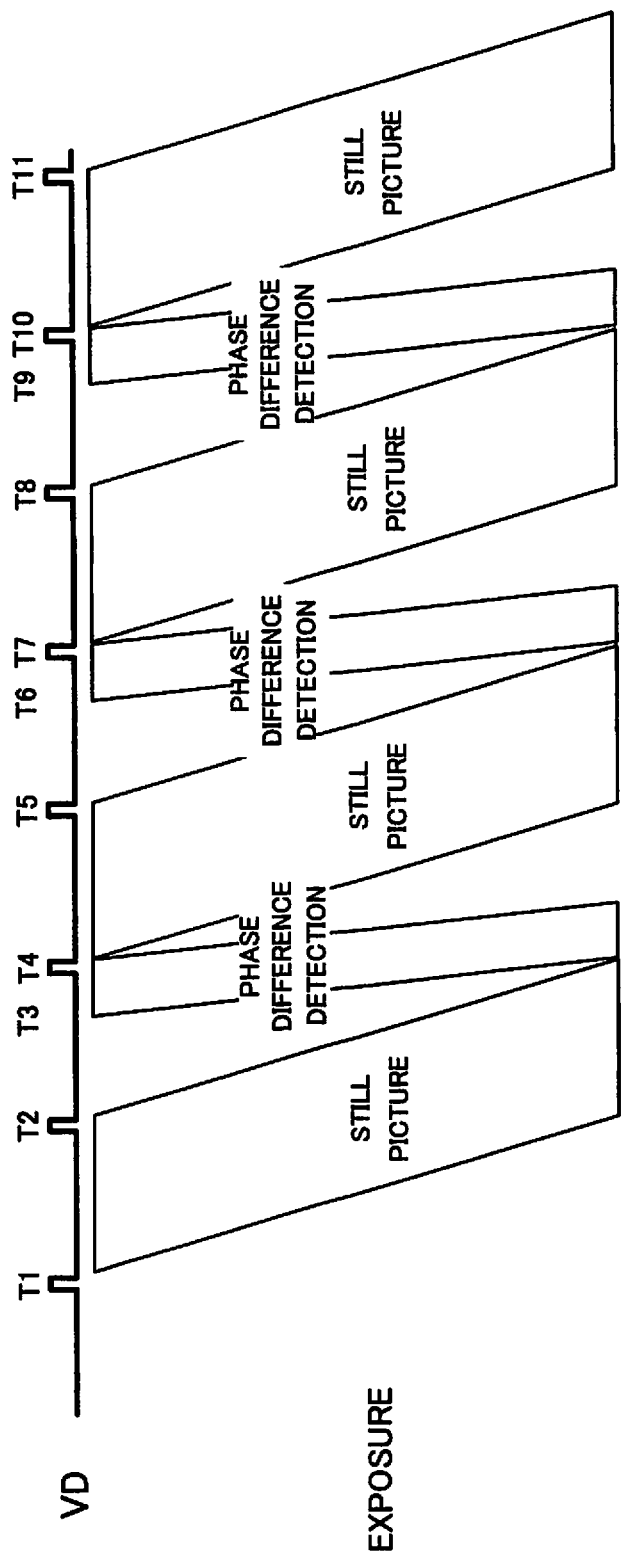
FIG. 5 is a timing chart showing exposure operation at the time of still picture rapid shooting, in the imaging device of one embodiment of the present invention.

Next, the actual exposure (still picture frame) and AF exposure (phase difference frame) in step S43 will be described using FIG. 5 (refer to S43 in FIG. 13B, which will be described later). In FIG. 5, VD represents timing of a vertical synchronization signal, and T1 to T11 in the horizontal axis direction represent times. At time T1 initial (first frame) actual exposure is commenced, at time T2 exposure for the first line is completed, and after that actual exposure for the second frame commences at time T4, actual exposure for the third frame commences at time T7, and actual exposure for the fourth frame commences at time T10. For respective actual exposures, as image data for a still picture, image data for only an image pixel signal is acquired from the image sensor 208.

Also, between one actual exposure and another actual exposure, pixel data of focus detection pixels for phase difference detection are read out. Specifically, at time T3 exposure for initial (first frame) phase difference detection is commenced, exposure for the first line is completed at time T4, and after that exposure for phase difference detection of the second frame commences at time T6, and exposure for phase difference detection of the third frame commences at time T9. In the respective exposures for phase difference detection, as image data for phase difference detection, image data for phase difference detection is acquired (refer to the previously described first readout). It should be noted that at the time of phase difference detection image data for phase difference detection is acquired corresponding to openings at one side, and phase difference detection image data corresponding to openings at the other side may be obtained by subtracting this phase difference detection pixel data from image data for an image that has been acquired for a still picture in a still picture frame immediately before, for example (refer to the previously described second readout).

In this way, with this embodiment, when acquiring image data of a still picture with rapid shooting, exposure for phase difference detection (phase difference frame) is performed between one actual exposure for still picture shooting (still picture frame) and another actual exposure. Specifically, an imaging mode of the image sensor so as to alternately perform imaging operations to generate pixel signals for storage, and imaging operations to generate phase difference detection pixel signals, is provided. This means that it is possible to read out a pixel signal for storage and a phase difference detection pixel signal at high speed without the occurrence of invalid frames. Accordingly, since there is no need for live view frames switching of imaging drive modes and invalid frames accompanying that switching do not arise, and it is possible to significantly improve rapid shooting speed. Also, since an image for storage is not degraded, and it is possible to perform focus detection of the subject, it is possible to acquire a focused image even with a moving subject when high-speed rapid shooting is in progress. Also, the imaging drive mode for alternately and repeatedly executing a still picture frame and a phase difference frame may be set in advance within the image sensor 208. With this structure it is possible to reduce the amount of communication from the CPU 212 to the image sensor 208, such as commands for switching imaging drive mode.

Next, an example of pixel addition at the time of first readout will be described using FIG. 6. With the example shown in FIG. 6, setting is performed so as to perform only addition in the vertical direction, which is the second pupil division direction, without performing addition for the horizontal direction, which is the first pupil division direction. Specifically, in the horizontal direction pixel signal setting is performed so that signals for the same openings (associated left openings or associated right openings) are subjected to 1/1 pixel addition (that is, no addition), and in the vertical direction pixel setting is performed so that signals for the same openings (associated left openings or associated right openings) are subjected to 5/9 pixel addition. Here, 5/9 pixel addition means adding of 5 pixels R1 corresponding to n1 to n9, or the addition of 5 pixels Gbl corresponding to n2 to n10, among 9 pixels in the vertical direction (with the example of m1 in FIG. 6, 9 respective pixels for R1 corresponding to n1 to n17, or 9 respective pixels Gbl corresponding to n2 to n18). A number of additions of pixel signals may be set appropriately in accordance with frame rate, for example.

Figure 6:
FIG. 6 is a drawing showing subjects of pixel addition for the image sensor, and pixel addition results of the image sensor, in the imaging device of one embodiment of the present invention.

FIG. 6 shows a generation method for added pixels for phase difference pixels (focus detection pixels) of a phase difference frame, for every column. The upper drawing in FIG. 6 shows arrangement of each pixel for a 2PD structure image sensor. In this drawing, R1 arranged at position (m1, n1) means a left-side opening red pixel, and Rr arranged at position (m2, n1) means a right-side opening red pixel. Also, Gbl arranged at position (m1, n2) means a left-side opening green pixel, and Gbr arranged at position (m2, n2) means a right-side opening green pixel. Although not described in detail, "B" means a blue pixel.

The example shown in the lower drawing of FIG. 6 shows a case where only (G) pixels are extracted, in order to increase speed and reduce power consumption. For example, with column m1 an added value Gr_L for a line of left side opening Grl pixels n1, n3, n5, n7 and n9 of column m3 in the upper drawing of FIG. 6 is calculated, and with column m2 an added value Gr_R for a line of right side opening Grr pixels n1, n3, n5, n7 and n9 of column m4 in the upper drawing of FIG. 5 is calculated. Also, similarly, with column m1 an added value Gb_L for a line of left opening Gbl pixels n2, n4, n6, n8 and n10 of column m1 in the upper drawing of FIG. 6 is calculated, and with column m2 an added value Gb_R for a line of right opening Gbr pixels n2, n4, n6, n8 and n10 of column m2 in the upper drawing of FIG. 6 is calculated. As shown in the lower drawing of FIG. 6, other addition pixel values are also calculated by means of the calculation processing with the same procedure. This kind of pixel value addition processing is executed by sections within the image sensor 208 (analog processing section 23, etc.), in accordance with instructions of the CPU 212 In the case of a 4PD pixel structure image sensor also, as a result of two vertical pixel addition of (PDa+PDb) and (PDc+PDd) in FIG. 4 pixel values for the same pixel arrangement as in the upper drawing of FIG. 6 are equivalently obtained, and so it is possible to perform the same addition processing.

In this way, for each line, addition values Gr_L, Gr_R, Gb_L and Gb_R for 5 pixels of Grl and Grr pixels, or Gbl and Gbr pixels, are calculated, and stored in memory in the format shown in the table in the lower drawing of FIG. 6. The correlation calculation of step S45 etc., which will be described later, is implemented using these addition values G_L and Gr_R, and Gb_L and Gb_R.

By performing 5/9 pixel addition such as shown in FIG. 6, the number of lines of pixel signals is compressed. By reducing the number of lines of pixel signals, readout time for the pixel signals is shortened. On the other hand, number of columns of pixel signals does not change, which means that it is possible to ensure detection precision for phase difference in the horizontal direction. Also, a focus detection pixel signal generated based on a pixel signal has information on phase difference in a substantially diagonal direction. It should be noted that with the example shown in FIG. 6, although setting has been performed so as to add five pixel signals for the vertical direction, the number of additions in the vertical direction may be five pixels or less. For example, a V1/9 method may be adopted where one pixel is selected from among nine pixels in the vertical direction.

After setting of pixel readout, such as shown in FIG. 6, the CPU 212 outputs control signals to the image sensor 208 so as to perform imaging at an exposure time necessary to generate a focus detection pixel signal (for phase difference detection). This exposure time is set based on subject brightness etc. Also, receiving input of control signals from the CPU 212, the element control section 29 commences imaging (accumulation of charge) for each line of the pixel section 22. The element control section 29 then controls a vertical scanning section 21 to sequentially output pixel signals from lines of the pixel section 22 for which imaging has been completed.

Next, alternate readout of still picture readout frames and phase difference frames during rapid shooting, and lens synchronization control, will be described using FIG. 7. As was described using FIG. 5, during rapid shooting continuous AF (CAF), alternate reading pixels from the image sensor 208 is executed. This alternate read is the alternate performing of readout for still picture exposure and readout for phase difference detection exposure (PD divided exposure). Specifically, at the time of exposure for still picture shooting, with the 2PD pixel structure shown in FIG. 3 an added value for photodiodes PD1 and PD2 is read out. With the 4PD pixel structure shown in FIG. 4 an added value for photodiodes PDa to PDd is read out. Also, at the time of exposure for phase difference detection PD divided exposure is performed. For example, with the 2PD pixel structure shown in FIG. 3 photodiodes PD1 and PD2 are read out. With the 4PD divided structure shown in FIG. 4, added values for photodiodes PDa+PDb, and PDc+PDd, or for photodiodes PDa+PDc and PDb+PDd, are read out.

When reading out a pixel signal from the image sensor 208, the camera body 200 outputs a lens synchronization signal that has been synchronized to a readout commencement pulse VD to the interchangeable lens 100. This lens synchronization signal may have period aligned with the commencement pulse VD, and as shown in FIG. 7 may have double the period compared to the readout commencement pulse VD. With the example shown in FIG. 7, VD is output at times T1, T2, T4, T5, T7, T8, T10, T11 and T13. On the other hand, the lens synchronization signal is output at times t1, t4, t7, t10 and t13, and has doubled the period of VD. It should be noted that a lens synchronization pulse (signal) may have another period besides the same period or double the period of VD. Also, phase of the lens synchronization signal may be perfectly aligned with phase of the readout commencement pulse VD, and may be displaced by a specified amount. With the example shown in FIG. 7, the phases of both pulses are perfectly aligned.

Next, drive instruction and state transmission, performed at the time of alternate readout of a still picture readout frame and a phase difference frame during rapid shooting, will be described using FIG. 8. Communication between the camera body 200 and the interchangeable lens 100 is executed using serial communication via the I/F 110.

The camera body 200 performs state transmission So at a specified timing. State transmission is communication for notifying lens state (aperture, lens position, zoom states etc.). If the lens CPU 106 receives a state transmission, lens state information that has been requested is returned to the CPU 212 of the camera body 200. Also, the CPU 212 of the camera body 200 transmits a drive instruction Di to the lens CPU 106 of the interchangeable lens 100 at a specified timing. It is generally possible for the camera body 200 side to ascertain lens state for every frame as a result of the lens CPU 106 transmitting a state signal once per single synchronization.

The drive instruction Di is transmission to designate aperture position and lens position relating to drive target, and to instruct drive commencement. If the lens CPU 106 receives a drive instruction Di, it commences lens drive and aperture drive at a timing that has been designated with the lens synchronization signal as a reference. If a drive instruction has been transmitted from the CPU 212 of the camera body 200 to the lens CPU 106 of the interchangeable lens 100, the interchangeable lens 100 performs designated drive at the time of the next "lens synchronization signal". A drive instruction includes timing for executing drive that has been designated with lens synchronization signal as a reference. Since time for execution of drive can be instructed with the lens synchronization signal as a reference, it is possible to accurately realize time for execution of lens and aperture drive. Since there is serial communication between the camera body 200 and the interchangeable lens 100, it is difficult to commence drive at the transmission timing of the drive instruction, but because the lens synchronization signal is made a reference it is possible to precisely control timing of lens drive and aperture drive.

Also, with the example shown in FIG. 8, lens drive is executed using "absolute drive". This example is a case where a subject has changed or become significantly blurred, and is a case where the focus movement amount is larger than a predetermined value. In this type of state a focus lens is therefore driven significantly. With this embodiment, therefore, the CPU 212 of the camera body 200 instructs absolute drive to the lens CPU 106. Absolute drive is, for example, a method used in a drive case where a focus lens is driven rapidly (at maximum speed) to a position (absolute position) that is focused on the subject based on calculation results of moving body estimation computation etc. In a case where the photographing lens 102*a* is being driven using absolute drive, the focus position changes significantly during exposure and joint readout of pixel signals, and so image quality of a still picture is degraded. With this embodiment, therefore, it is determined that image data that has been acquired during absolute drive is not to be stored as image data for a still picture. Specifically, although live view display is performed by reading out pixel signals from the image sensor 208, image processing for a still picture is not performed and there is no storage to the storage medium 230. In the case of driving an aperture also, image data that is been acquired during aperture drive is similarly not stored as a still picture, and pixel signal information us used only for live view.

With the example shown in FIG. 8, a drive instruction Di is output from the CPU 212 of the camera body 200 to the lens CPU 106 of the interchangeable lens 100. At this time, the fact that there is absolute drive is included in the drive instruction Di, and further, drive direction and target position of the lens etc. are included. If time t4 is reached, the lens synchronization signal is transmitted from the camera body 200 to the interchangeable lens 100, and the focus lens 102a is subjected to absolute drive with this lens synchronization signal as a reference (refer to S87 in FIG. 14, which will be described later). In the example shown in FIG. 8, the focus lens 102a is at a position that is focused at infinity from time t1 to time t4, and drive in accordance with absolute drive is performed from time t4 in the close-up direction based on the drive instruction Di.

Figure 9:
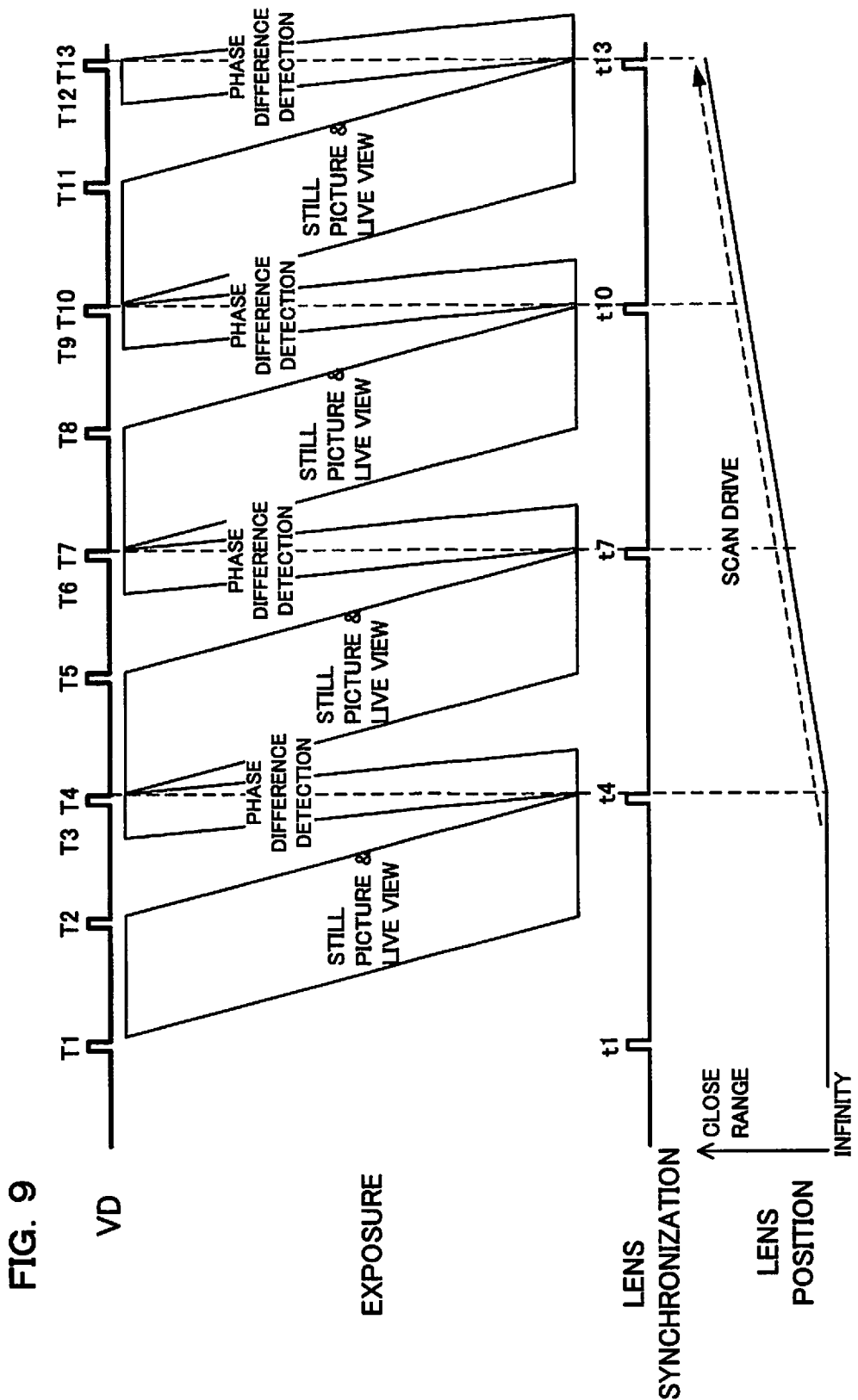
FIG. 9 is a timing chart showing operation in a case of scan drive of a focus lens, at the time of still picture rapid shooting, in the imaging device of one embodiment of the present invention.

Next, a case where lens drive it performed using "scan drive" will be described using FIG. 9. "scan drive" is a drive method for controlling drive speed of the focus lens 102a so as to attain a designated movement velocity. While a subject is moving at a constant velocity, the lens CPU 106 drives the focus lens 102a at a constant speed, in conformity with subject movement velocity. In FIG. 9, a dotted line shown in the lens position field is subject position (converted to lens position), and the CPU 212 instructs to the lens CPU 106 so as to perform constant speed drive of focus lens position in conformity with change in the subject position (refer to S81 in FIG. 14, which will be described later). Also, since the focus lens 102a is moving at a constant speed in conformity with movement of the subject, at this time image quality of image data that is acquired is sufficient as a still picture. Therefore, although storage of a still picture is not performed in the case of the absolute drive that was shown in FIG. 8, and only live view display was performed (before to the exposure at times T4 to T10 in FIG. 8), in the case of scan drive storage of a still picture is also performed together with live view display (referred to the exposures at T4 to T13 in FIG. 9).

However, in a case where the subject is moving at 50 mm/s, for example, movement velocity of the image plane of the image sensor 208 increases exponentially. Specifically, in a case where the subject becomes close, magnification also changes, which means that movement velocity is increased in proportion to the square of the subject distance. With a subject that moves at a constant speed when looking through a macro level also, in a case where the subject is a person or an animal etc., depending on how the subject walks and the way in which the body moves, movement velocity varies minutely if viewed at the micro level. Therefore, in a case where movement velocity of the subject is different, and a case where defocus amount has changed, drive speed is changed, as shown in FIG. 10.

Figure 10:
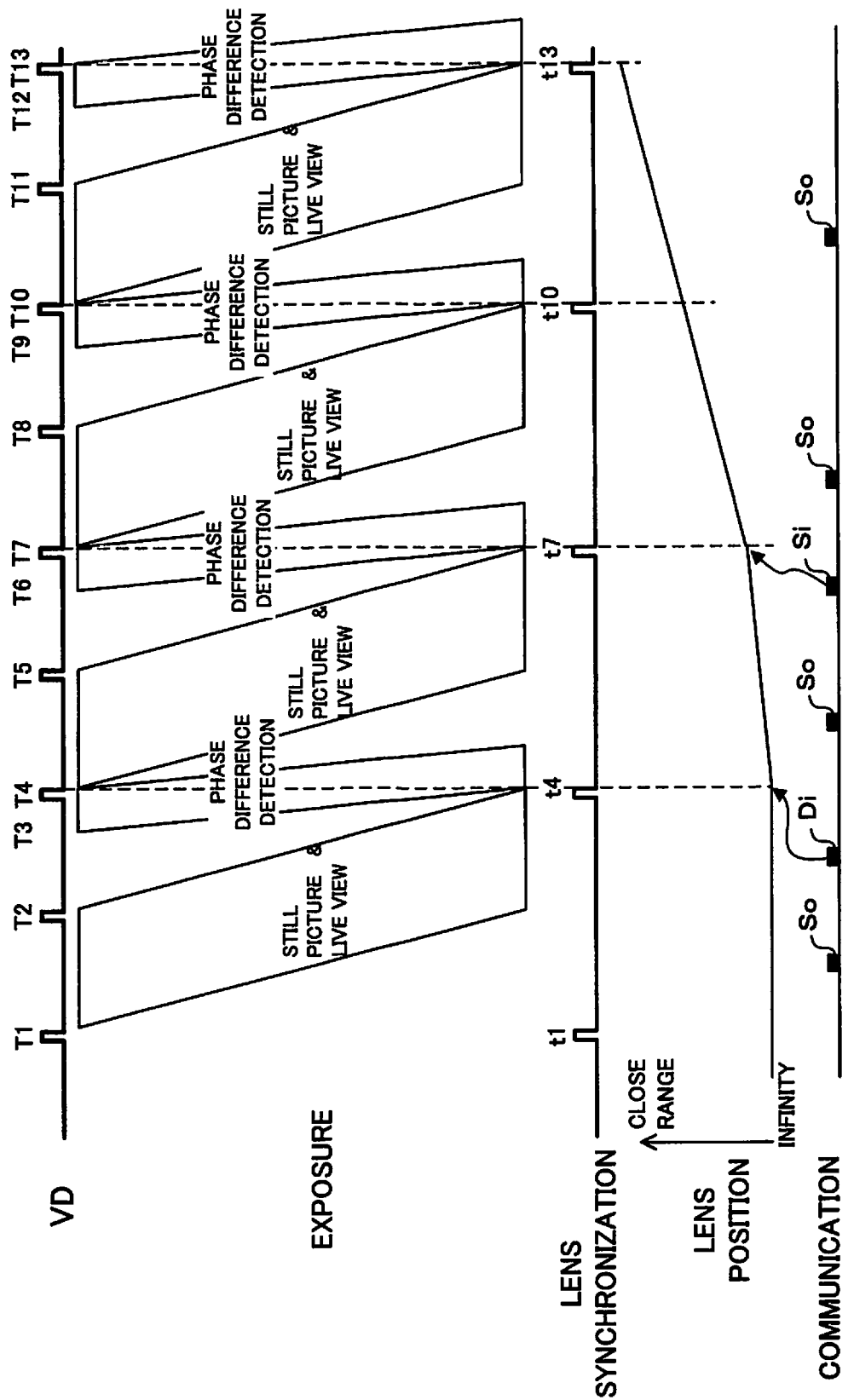
FIG. 10 is a timing chart showing operation in a case where drive speed is changed, at the time of scan drive of a focus lens, in still picture rapid shooting, in the imaging device of one embodiment of the present invention.

In FIG. 10, the CPU 212 outputs a scan drive instruction Di to the lens CPU 106 at a time just before time t4. The lens CPU 106 controls drive speed of the focus lens 102a in accordance with this scan drive instruction. Then, at a time just before time t7 the CPU 212 outputs a speed change instruction Si to the lens CPU 106. The lens CPU 106 controls drive speed of the focus lens 102a in accordance with this speed change instruction. In this case, the CPU 212 calculates image plane movement velocity for the subject based on results of phase difference detection at time T3 to T4, and results of phase difference detection earlier, and in the event that there is fluctuation in this calculation outputs a speed change instruction Si to the lens CPU 106 so as to track the image plane movement velocity that has fluctuated.

Next, a case where lens drive is performed using "relative drive" will be described using FIG. 11. "relative drive" is a drive method for designating relative drive amount and lens speed. For example, in a case where the subject moves minutely forward or backwards, the subject is tracked by performing lens drive minutely as well using relative drive. Also, in a case where a subject moves in one direction, if the subject movement velocity is slower than a lower limit speed that can be set with scan drive it is difficult to track a subject using scan drive. In this type of case control is performed to track the subject by intermittently executing relative drive. For example, in one frame, of two successive frames of still picture exposure on either side of a phase difference detection frame, lens drive is implemented using relative drive, and in the other frame of the two frames, lens drive is not implemented. Image data resulting from the first exposure during relative drive is only used in live view display, and at the time of the second exposure where lens drive is not performed still picture exposure is implemented. For example, in the example shown in FIG. 11, relative drive is performed during time T4 to T7, and live view display is performed based on image data resulting from exposure at that time. Also, drive is not performed during time T7 to T10 (that is, lens drive is prohibited), image data of a still picture is acquired based on image data resulting from exposure at that time, and this image data is stored.

It should be noted that the relative drive shown in FIG. 11 will have a slower rapid shooting speed than the relative drive shown in FIG. 12, which will be described later. However, since it is possible to implement with half the amount of image processing it is possible to reduce required capacity of image processing capability. As a result, by reducing average power consumption lifespan of the power supply battery is extended, heat generation is reduced, and the number of rapidly taken continuous shots is increased, which is an advantage. Also, with the example shown in FIG. 11, focus lens drive is performed with one frame of two frames either side of a phase difference detection frame, and focus drive is prohibited in the other frame. However, the ratio of frames in which the focus lens is moved and frames in which movement is prohibited is not restricted to 1:1, and may be another ratio such as 1:2 or 2:1. In this case also, in a case where the focus lens is moved using relative drive, still picture storage is prohibited based on exposure during focus lens movement.

Next, a modified example of "relative drive" will be described using FIG. 12. This modified example is a derivative of the relative drive that was shown in FIG. 11, and by performing microdrive it is possible to perform rapid shooting at a higher speed than for the case of the example that was shown in FIG. 11. Microdrive is a drive method that is implemented using relative drive of minuscule drive amounts that does not result in problems of image quality of a still picture. Example, drive amount of 0 to ±2Fδ (up to twice permissible depth) is executed using relative drive. It should be noted that F is aperture value and δ is permissible circle of confusion. Accordingly, there is no effect on image quality of a still picture even if microdrive of the focus lens is executed during still picture exposure. By executing microdrive in parallel with still picture exposure during rapid shooting, it is possible to store still pictures that are continuous with a phase difference detection frame in between, without including frames for live view (FIG. 11). Specifically, with the example that was shown in FIG. 11, exposures from time T4 to T7 are only for live view display, while exposures from time T7 to T10 are for still picture storage (live view display). However with the modified example shown in FIG. 12, exposures from time T4 to T7, and from T7 to T10 are used for both live view display and still picture storage. It should be noted that aperture drive is not executed during the rapid shooting operation in FIG. 12.

Next, operation of the imaging device 1 of this embodiment will be described using the flowcharts shown in FIG. 13A and FIG. 13B. Here, FIG. 13A and FIG. 13B show operation at the time when an AF mode of the imaging device 1 is continuous AF mode. Continuous AF mode is an AF mode that is suitable for a moving subject, and is an AF mode in which focusing is performed continuously so as to track a subject. It should be noted that the flowcharts shown in FIG. 13A and FIG. 13B (this also includes FIG. 14 to FIG. 16 that will be described later) are realized by the CPU 212 of the camera body 200 controlling each section within the camera body 200 and the interchangeable lens 100 in accordance with programs that have been stored in the body side storage section 228.

Figure 13A:
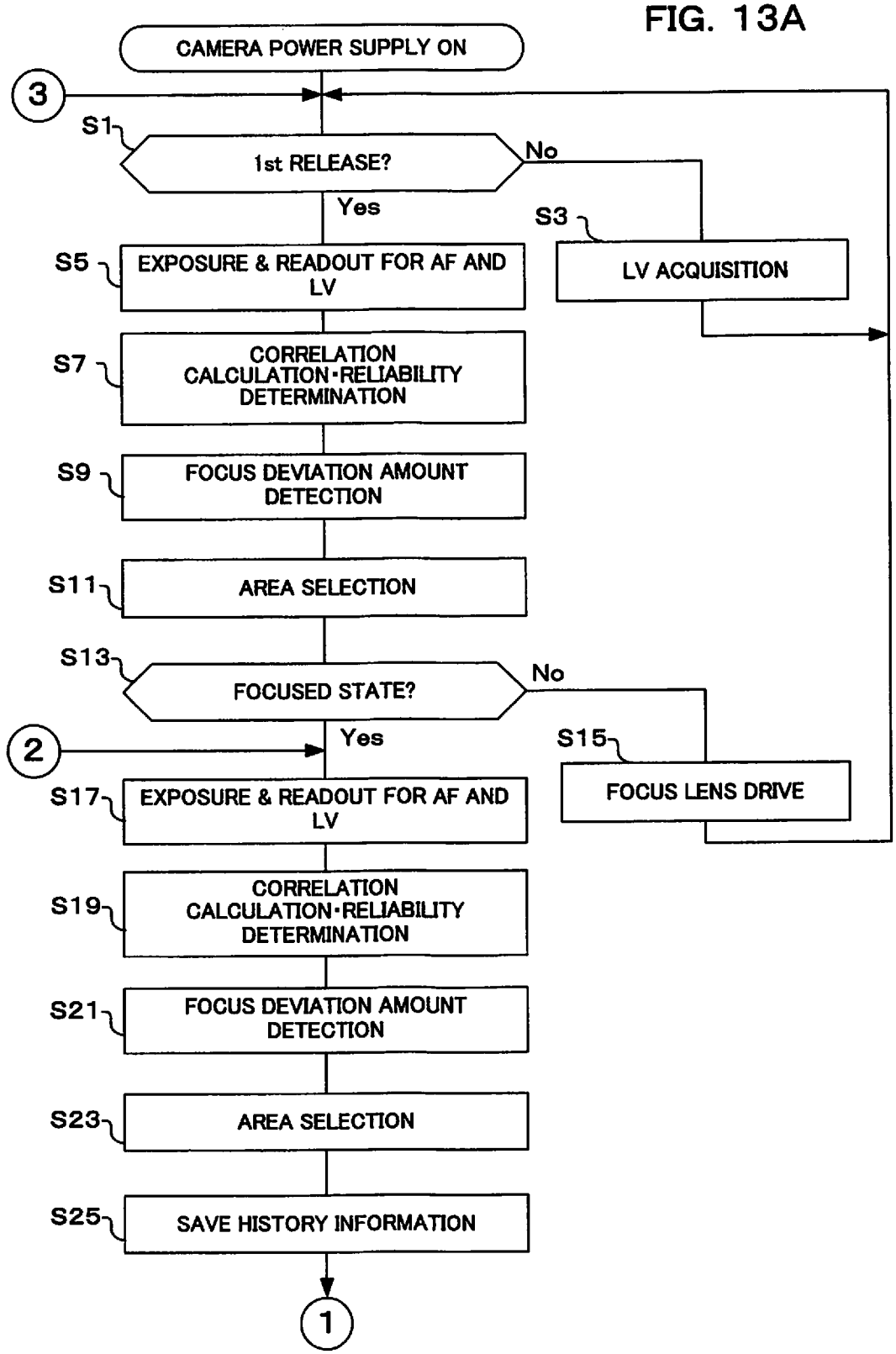

If it is detected that the user has performed an ON operation of the power supply of the imaging device 1, the flow for camera power supply ON shown in FIG. 13A is commenced. If the power supply ON operation is detected, it is first determined whether or not a 1st release is on (S1). Here, the CPU 212 determines whether or not a 1st release switch of a release button within the operation section 206 is in an on state. The 1st release switch is a switch that is put in an on state in response to a half press operation of a release button by the user, for example. If the user focuses on a subject and decides on exposure, the release button is pressed down halfway.

If the result of determination in step S1 is that the 1st release switch is not on, acquisition of live view (LV) is performed (S3). Here, the CPU 212 outputs a control signal to the drive section 204 so as to put the mechanical shutter 202 in a fully-open state, as well as outputting a control signal to the lens CPU 106 so as to move the aperture 102b by a given amount (for example, open aperture). After that, the CPU 212 reads out control signals for the image sensor 208 every predetermined time (time determined by frame rate), and performs imaging for LV display using the image sensor 208. Every time imaging for LV display is completed, the element control section 29 reads out pixel signals from the pixel section 22. It should be noted that at the time of pixel signal readout, the element control section 29 may add pixel signals of the same opening (same color) output from the pixel section 22. Pixel data for display that has been output from the image sensor 208 is stored in the DRAM 226.

Also, the CPU 212 performs live view (LV) display in step S3. At this time, the CPU 212 causes generation of display image data in the image processing circuit 214. The image processing circuit 214 performs necessary processing on the pixel data that has been read out from the image sensor 208, to generate display image data for display. Display image data is obtained by additive averaging of pixel data of photodiodes PD1 and PD2 (with a 4PD pixel structure, PDa to PDd) that belong to the same pixel section 22. The CPU 212 displays an LV image on the display section 222 based on display image data that has been generated by the image processing circuit 214. Once the LV display has been performed, processing returns to step S1.

If the result of determination in step S1 is that the 1st release switch is on, exposure and readout for AF and LV are performed (S5). Here, the CPU 212 performs imaging and readout for autofocus (AF) and LV display. Imaging and readout for AF may be performed as described in the following, for example. Specifically, imaging and readout for AF may be performed by reading out a pair of focus detection pixel signals from the image sensor 208, imaging and readout for LV display may be performed by reading out addition values of the pair of focus detection pixel signals A and B, and this readout processing may be performed alternately. Alternatively, one of either of the pair of focus detection pixel signals A and B (here, for example, it is made the focus detection pixel signal A) from the image sensor 208, and an image pixel signal (A+B) resulting from addition of the pair of focus detection pixel signals A and B, are read out. Then, by subtracting the focus detection pixel signal A from the added image pixel signal (A+B) it is possible to obtain the focus detection pixel signal B. The added image pixel signal (A+B) is also used for LV display.

Data of the focus detection pixel signals A and B, for performing focus detection by a phase difference method using the focus detection pixel signals A and B that were calculated in step S5, is stored in the DRAM 226. It should be noted that in a case where a 4PD pixel structure is adopted, it is possible to calculate a pair of focus detection pixel signals for one of the horizontal direction (left right direction) or vertical direction (up down direction) for every 4PD pixel. This pair of focus detection pixel signals are stored in the DRAM 226, in order to calculate phase difference for respective directions using the pair of focus detection pixel signals. Also, the image pixel signal (A+B) is stored in the DRAM 226 as displayed pixel data for LV. Here, live view display is performed based on the pixel data for display that has been stored in the DRAM 226.

Next, correlation calculation and reliability determination are performed (S7). Here, the CPU 212 executes focus detection calculation using the focus detection circuit 218. The focus detection circuit 218 performs correlation calculation using focus detection pixel data (focus detection pixel signals A and B) that constitute a pair, among focus detection pixel data that is stored in the DRAM 226. Focus detection pixel data that constitutes a pair in the case of phase difference detection in the horizontal direction is the left opening pixel data L and the right opening pixel data R, while the focus detection pixel data that constitutes a pair in the case of phase difference detection in the vertical direction is the top opening pixel data T and the bottom opening pixel data B. After correlation calculation, the focus detection circuit 218 performs reliability detection for focus detection. Reliability determination is determination based on contrast obtained from pixel data, for example, and correlation values etc. are calculated as results of correlation calculation.

Once correlation calculation and reliability determination have been performed, next focus deviation amount is detected (S9). Here, the focus detection circuit 218 performs focus deviation amount calculation. Specifically, the focus detection circuit 218 calculates focus deviation amount between a current position and an in-focus position of the focus lens 102a using a two-image interval value for focus detection regions (there are also cases where there are a plurality of regions) in which it has been determined that the result of reliability determination in step S7 is high reliability (image shift amount corresponding to extreme value of correlation value).

If a focus deviation amount has been detected, next an area is selected (S11). Here, the focus detection circuit 218 performs area selection processing in order to select a focus detection region corresponding to a focus lens position used in drive of the focus lens 102a. Area selection processing selects a focus detection region exhibiting a focus deviation amount corresponding to a focus lens position in accordance with the closest subject distance (that is, at the closest range), for example. Also, the area selection processing may select an area in which a person's face exists, and it is also possible have an area that has been selected manually by the user. It should be noted that area selection may also be performed by the CPU 212.

If area selection has been performed, it is next determined whether or not there is a focused state (S13). Here, the CPU 212 determines whether or not the focus lens 102a is in a focused state. This determination is determination as to whether or not a focus deviation amount for the focus detection region that was selected in the area selection processing, for example, is within a previously determined permissible range. When the focus deviation amount is within a permissible range a focused state is determined.

If the result of determination in step S13 is not a focused state, the focus lens is driven (S15). Here, the CPU 212 outputs a control signal to the lens CPU 106 so as to drive the focus lens 102a to a focus lens position that was calculated for the focus detection region that was selected in step S11. The lens CPU 106 receives this control signal and drives the focus lens 102a by means of the drive section 104. Once the focus lens 102a has been driven processing returns to step S1.

If the result of determination in step S13 is a focused state, exposure and readout for AF and LV are performed (S17). Here, the CPU 212 performs the same imaging and readout for autofocus (AF) and live view (LV) display as was performed in step S5. As was described previously, a pixel signal is read out from the image sensor 208 using first readout, focus detection pixel data for AF is stored in the DRAM 226, and display pixel data for LV is stored in the DRAM 226. Also, live view (LV) display is performed using the display pixel data for LV.

Next, correlation calculation and reliability determination are performed (S19). Here, similarly to step S7, the CPU 212 causes execution of focus detection calculation by the focus detection circuit 218, using a pixel signal that was read out in step S17. The focus detection circuit 218 performs correlation calculation using focus detection pixel data that constitute a pair, among focus detection pixel data that is stored in the DRAM 226. After correlation calculation, the focus detection circuit 218 performs reliability detection for focus detection. If correlation calculation and reliability determination have been performed, next, similarly to step S9, focus deviation amount is detected (S21), and, similarly to step S11, area selection is performed (S23).

Once area selection has been performed, next, history information is saved (S25). Here, the focus detection circuit 218 saves information relating to focus detection as history information in the DRAM 226, for example. Information relating to focus detection includes, for example, information on the focus deviation amount that was calculated in step S21, and information on the focus detection region that was selected in step S23. It should be noted that saving of history information may also be the CPU 212 saving information relating to focus detection in the body side storage section 228.

Once history information has been saved, it is next determined whether or not the 2nd release switch is on (S31). Here, the CPU 212 determines whether or not the 2nd release switch within the operation section 206 has been turned on. The 2nd release switch is a switch that is put in an on state in response to a full press operation of a release button by the user, for example. The user presses the release button down fully in the case of shooting a still picture.

If the result of determination in step S31 is that the 2nd release switch is not on, it is next determined whether or not there is a focused state (S33). Here, the CPU 212 determines whether or not the focus lens 102a is in a focused state, similarly to step S13. If the result of this determination is a focused state, processing returns to step S17.

If the result of determination in step S33 is not a focused state, the focus lens is driven (S35). Here, similarly to step S15, the CPU 212 moves the focus lens 102a to an appropriate focus lens position based on the focus deviation amount. If focus lens drive has been performed, processing returns to step S17.

If the result of determination in step S31 is that the 2nd release switch is on, next, moving body estimation computation is performed (S37). Here, the CPU 212 causes execution of moving body estimation computation by the focus detection circuit 218. Moving body estimation computation is estimating a position the focus lens 102a should be driven to for the current still picture exposure time, based on history of results of previous focus deviation amount calculation (focus lens position) that were stored in step S25.

If moving body estimation computation has been performed, next, a shutter operation is commenced (S39). Here, the CPU 212 causes commencement of operation of the mechanical shutter 202 in order to perform imaging (actual exposure) for still picture acquisition. This operation of the mechanical shutter 202 includes opening and closing operations of the mechanical shutter 202 before and after actual exposure, and a fully open operation of the mechanical shutter 202 after actual exposure, in order to commence imaging for live view and AF. The CPU 212 first switches control signals of the drive section 204 so as to put the mechanical shutter 202 in a fully closed state. Then, after actual exposure has been performed in step S43, the CPU 212 controls the drive section 204 so as to put the mechanical shutter 202 in a fully closed state.

If the shutter operation has been commenced, the aperture and lens drive are simultaneously commenced (S41). Here, the CPU 212 instructs the lens CPU 106 so as to drive the focus lens 102a and the aperture 102b at the same time, and both operations are commenced. Here, drive position for the focus lens 102a is a position that was estimated in the moving body estimation computation of step S37. Also, opening amount of the aperture 102b is an opening amount corresponding to the aperture value that has been calculated based on subject brightness that was estimated as a result of previous photometry computation.

Next, actual exposure, and AF exposure and readout, are performed (S43). Here, the CPU 212 causes actual exposure to start, and after actual exposure has been completed reads out pixel signals from the image sensor 208. This readout gives a value resulting from addition of output values of photodiodes for every pixel section. Actual exposure is imaging in order to acquire image data for storage. With actual exposure, the CPU 212 causes commencement of imaging of the image sensor 208. After an exposure period is complete, the CPU 212 reads out pixel signals from each light receiving section of the image sensor 208 as still picture pixel signals. Image processing on pixel signals that have been read out in this step is performed in step S55.

Also, in step S43, the CPU 212 continues alternation of actual exposure and readout (still picture), and AF exposure and readout (phase difference detection), as was described using FIG. 5. AF exposure is performing exposure with exposure control values (for example, electronic shutter speed and ISO sensitivity) at which appropriate exposure is achieved on focus detection pixels. Also, AF exposure is performed between one actual exposure and another actual exposure. This pixel signal readout for AF exposure may be read out of a signal from the focus detection pixels. Also, if readout of a pixel signal from the focus detection pixels is performed for actual exposure, live view display is performed based on this pixel signal. It should be noted that live view display may also be performed along with performing the image processing for still picture in step S55. In this case, there may also be cases where image processing for still picture storage is not performed, depending on the frame, but image processing for live view display is executed for every frame.

Once the AF exposure and readout of step S43 have been performed, next, correlation calculation and reliability determination are performed (S45). After actual exposure and readout have been performed in step S43, AF exposure and readout are performed, and processing from steps S45 to S53 is performed. The correlation calculation and reliability determination of step S45 is performed similarly to steps S7 and S19, using a signal from focus detection pixels that was acquired in step S43.

Once correlation calculation and reliability determination have been performed, next, focus deviation amount is detected (S47). Here, focus deviation amount is detected similarly to steps S9 and S21, based on the correlation calculation that was calculated in step S45. Next, area selection is performed (S49). Here, the focus detection circuit 218 performs area selection, similarly to steps S11 and S23, based on a focus deviation amount that was detected in step S47.

Once area selection has been performed, next, history information is saved (S51). Before rapid shooting of still pictures and during rapid shooting of still pictures, AF exposure is performed continuously (refer to S17 and S43), and focus deviation amount is detected. The focus detection circuit 218 (or CPU 212) saves information relating to focus detection as history information in the DRAM 226, for example.

Once history information has been saved, moving body estimation computation and lens drive instruction are performed (S53). Here, similarly to step S37, the CPU 212 performs moving body estimation computation in the focus detection circuit 218, based on history information that was saved in step S53. Also, the CPU 212 issues lens drive instruction to the lens CPU 106. Specifically, as was described using FIG. 8 to FIG. 12, the CPU 212 instructs a drive method for the focus lens, namely either of "absolute drive", "scan drive", or "relative drive", to the lens CPU 106 based on movement velocity etc. of the subject. Target position information of the focus lens, based on results of moving body estimation computation, also included in this drive instruction. Once the lens CPU 106 has received the drive instruction, the drive section 104 etc. is controlled and drive of the focus lens is performed in accordance with the drive instruction. Detailed operation of this moving body estimation computation and lens drive instruction will be described later using FIG. 14.

If the moving body estimation computation etc. has been performed in step S53, next, image processing of the still picture is performed (S55). Here, the CPU 212 subjects image data that was acquired in step S43 to image processing for still picture storage, in the image processing circuit 214. However, in the case of absolute drive that was described in FIG. 8, and in a case of relative drive that was described in FIG. 12, there are frames for which still picture storage is not performed. In a case where aperture drive is performed also, since there are cases where image quality is degraded, still picture storage is not performed. In this step S55, image processing of the still picture is performed taking these circumstances into consideration. After completion of image processing, the CPU 212 compresses the still picture data for storage using the image compression and expansion section 216. After completion of compression, the CPU 212 stores the still picture data for storage that has been compressed in the storage medium 230 as an image file. Detailed operation of the still picture image processing will be described later using FIG. 15 and FIG. 16.

If image processing has been performed in step S55, it is next determined whether or not the 2nd release switch is on (S57). If the user is continuing rapid shooting, the release button will still be pressed down fully. In this step, the CPU 212 determines whether or not the 2nd release switch within the operation section 206 has been turned on. If the result of this determination is that the 2nd release switch is on, step S43 is returned to and still picture rapid shooting continues.

On the other hand if the result of determination in step S57 is that the 2nd release switch is not on, it is next determined whether or not the 1st release switch is on (S59). Here, similarly to step S1, the CPU 212 determines whether or not a 1st release switch of a release button within the operation section 206 is in an on state. If the result of this determination is that the 1st release switch is on, processing returns to step S17 and the previously described processing is executed.

On the other hand, if the result of determination in step S59 is that the 1st release switch is not on, it is determined whether or not the camera power supply is off (S61). Here, the CPU 212 determines whether or not to turn the power supply of the camera body 200 off. For example, in a case where power supply off has been instructed as a result of operation of the operation section 206 by the user, or in a case where the user has not operated the operation section 206 for a predetermined time, it is determined that the power supply will be turned off. If the result of this determination is not to turn the power supply of the camera body 200 off, processing returns to step S1. On the other hand if it has been determined in step S61 to turn the power supply of the camera body 200 off, the processing is terminated.

In this way, in the flow of FIG. 13A and FIG. 13B, in a case where the release button has been pressed down fully actual exposure (still picture frame) and AF exposure (phase difference detection frame) are alternately and repeatedly executed (refer to S43). In a case where AF exposure has been performed, correlation calculation and detection of focus deviation amount are performed based on a pixel signal of focus detection pixels that has been acquired as a result of this AF exposure, and moving body estimation and focus lens drive are performed based on this detection result.

Also, the CPU 212 performs determination as to whether the focus lens will be subjected to "absolute drive", "scan drive", or "relative drive" based on the results of moving body estimation computation etc., and performs instruction for lens drive based on the results of this selection (S53). In a case where this lens drive instruction is "absolute drive" or "relative drive", image processing for a still picture is not performed for image data that has been read out, and storage of image data is prohibited (refer to FIG. 8 and FIG. 11).

Next, detailed operation of the moving body estimation computation and lens drive instruction of step S53 will be described using the flowchart shown in FIG. 14. If the flow for moving body estimation computation and lens drive instruction is commenced, first, subject position at the time of the next exposure is estimated from history information (S73). Here, the CPU 212 obtains subject position at the time of the next exposure by performing prediction computation, using history information that was stored in step S51. This prediction computation is calculation of focus lens position the time of the next exposure by linear computation using previous focus lens positions that have been stored in accordance with each time. Subject position has a one-to-one relationship with focus lens position.

If subject position at the time of the next has been obtained, it is next determined whether or not the subject has changed significantly (S75). Here, the CPU 212 compares the previous subject position and the next subject position that was calculated in step S73, and performs determination based on whether or not this difference is greater than a predetermined value.

If the result of determination in step S75 is that the subject has changed significantly, absolute drive is instructed (S87). Here, the CPU 212 transmits a focus lens position to the lens CPU 106, based on the subject position at the time of the next exposure that was calculated in step S73. At the time of this transmission, absolute drive that was described using FIG. 8 is instructed to the lens CPU 106. The lens CPU 106 performs control using absolute drive to the focus lens position that has been instructed from the CPU 212.

If the result of determination in step S75 is that the subject is not changing significantly, it is next determined whether or not the subject is moving at a constant velocity (S77). Here, the CPU 212 calculates change in previous subject positions, and determines whether or not the subject is moving at a substantially constant speed from this change. Specifically, The CPU 212 calculates speed based on a difference between current position and previous position of the subject, and a difference between previous subject position and subject position the time before that, and determines whether or not the subject is moving at a constant speed based on this speed. It should be noted that if change in speed is within a predetermined value, it is determined to be a substantially constant speed.

If the result of determination in step S77 is that the subject is moving at a constant speed, it is next determined whether or not the movement velocity is extremely small (S79). In step S77 the CPU 212 calculates subject speed from the time of the previous exposure to the next exposure. In this step, determination is based on whether or not the subject speed that has been calculated (which is a substantially constant speed) is smaller than a predetermined value.

If the result of determination in step S79 is that the movement velocity is not extremely small, scan drive is instructed (S81). Here, the CPU 212 transmits information relating to focus lens position to the lens CPU 106, based on the subject position at the time of the next exposure that was calculated in step S73. At the time of this transmission, scan drive that was described using FIG. 9 is instructed to the lens CPU 106. In this case, in a case where movement velocity of the subject is different, and a case where defocus amount has changed, scan drive speed is changed, as shown in FIG. 10. The lens CPU 106 performs control using scan drive to the focus lens position that has been instructed from the CPU 212.

If the result of determination in step S79 is that the movement velocity is extremely small, relative drive is instructed (S83). Here, the CPU 212 transmits information relating to focus lens position to the lens CPU 106, based on the subject position at the time of the next exposure that was calculated in step S73. At the time of this transmission, relative drive that was described using FIG. 11 or FIG. 12 is instructed to the lens CPU 106. Which type of relative drive to instruct, among the relative drives shown in FIG. 11 and FIG. 12, may be automatically selected in accordance with characteristics of the camera body 200 and interchangeable lens 100 etc. Also, there may be cases where it is only possible to select one type of relative drive, and in this case the type of drive may be uniformly determined. Also, in a case where rapid shooting speed is high, the control that was shown in FIG. 12 is used, but if rapid shooting speed is one step slower, and frame rate for live view has been set to a high-speed, there may also be cases where the control that was shown in FIG. 11 is used. In a case where relative drive that was shown in FIG. 11 is performed, for example, relative drive is only instructed at the time of odd number frames between phase difference detection frames, and at the time of even number frames focus drive is not performed and drive is stopped. The lens CPU 106 drives the focus lens to the focus lens position that has been instructed from the CPU 212.

Returning to step S77, if the result of determination in this step is that the subject is not moving at a constant speed, it is next determined whether or not subject movement is extremely small (S85). Here, the CPU 212 212 calculates movement amount of the subject based on the previous and current focus positions, and determines whether or not this movement amount is smaller than a predetermined value and is considered to be extremely small.

If the result of determination in step S85 is that the subject movement amount is extremely small, the previously described relative drive is instructed (S83). If subject movement velocity is extremely small, or subject movement amount is extremely small, movement amount of the focus lens 102a for tracking the subject becomes extremely small. If the focus lens is moved by such an extremely small amount, it is likely that overshoot etc. will arise, and there are cases where it is difficult to move the focus lens to a target position. With this embodiment therefore, a subject is tracked by performing the relative drive shown in FIG. 11 or FIG. 12.

If the result of determination in step S85 is that the subject movement amount is not extremely small, the previously described absolute drive is instructed (S87). In this case, the subject does not change significantly, but the subject is not moving at a constant speed, and movement amount of the subject is also not extremely small. In this type of case, since neither scan drive or relative drive are suitable, control is performed using absolute drive to move to a focus lens position at the fastest speed.

If scan drive is instructed in step S81, or if relative drive it is instructed in step S83, or if absolute drive is instructed in step S87, the originating flow is returned to.

Figure 14:
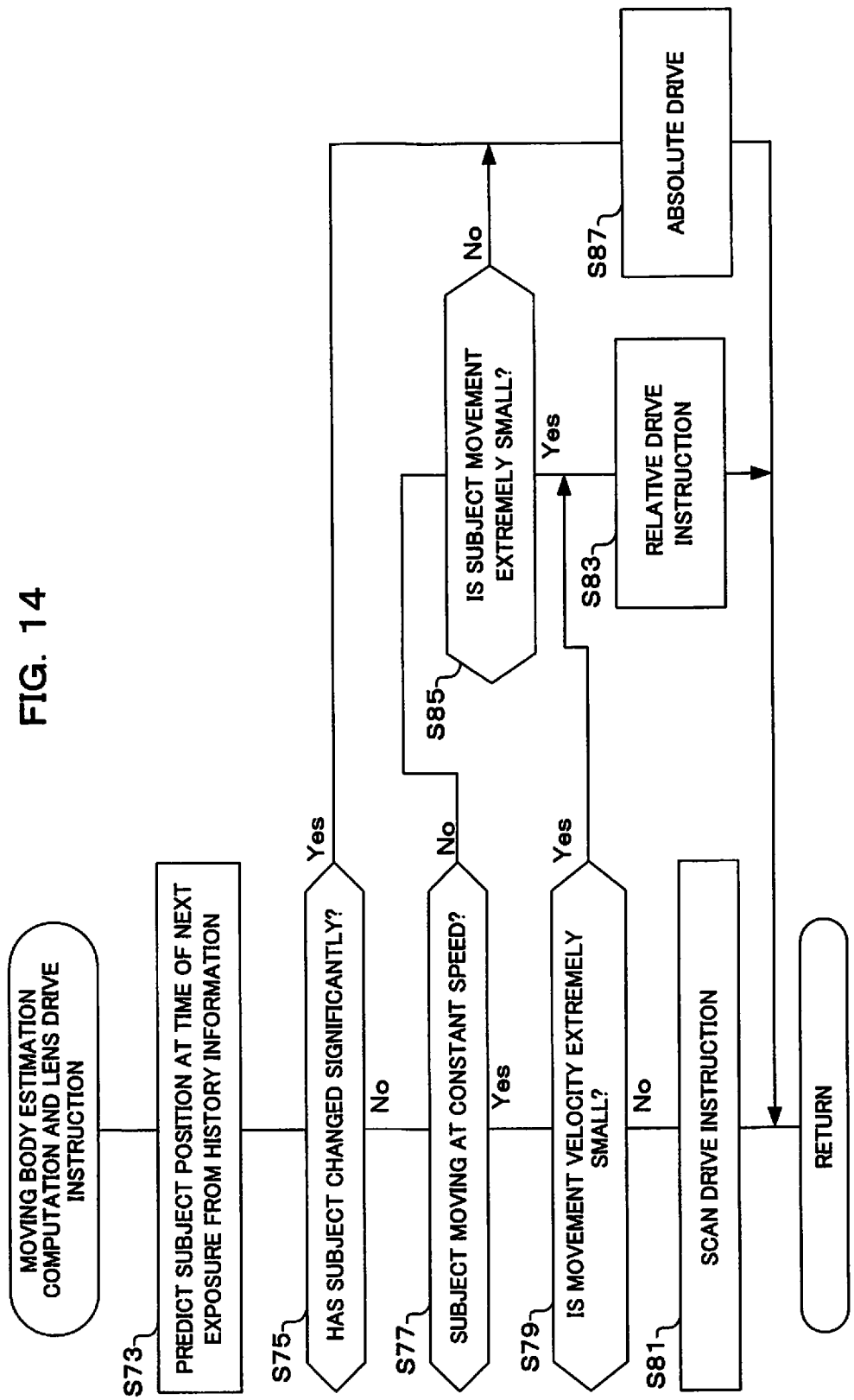
FIG. 14 is a flowchart showing operations of moving body estimation computation and lens drive designation, in the imaging device of one embodiment of the present invention.

In this way, in the flow for moving body estimation computation and lens drive instruction shown in FIG. 14, position of the subject at the time of the current exposure, movement velocity of the subject, movement amount of the subject etc. are determined based on history information for focus lens position (S75, S77, S79, S85), and based on the results of these determinations movement of the focus lens is controlled using either absolute drive, scan drive, or relative drive. As a result, it is possible to perform appropriate drive control for the focus lens in accordance with subject change.

Next, detailed operation of the image processing for a still picture in step S55 will be described using the flowchart shown in FIG. 15. The flowchart shown in FIG. 15 is adopted in a case where, as relative drive, both a system in which it is assumed that the relative drive shown in FIG. 11 is performed, and a system in which the relative drive shown in FIG. 11 and the relative drive shown in FIG. 12 are performed, are possible, and then if the relative drive of the system shown in FIG. 11 has been selected. In a case where the relative drive shown in FIG. 12 is performed, the flowchart shown in FIG. 16, which will be described later, is executed. It should be noted that in FIG. 15 and FIG. 16, the case where scan drive is performed has been excluded. In the case of executing scan drive, image processing for a still picture is executed from a still picture frame that is performed together with scan drive, as shown in FIG. 9 and FIG. 10, and still picture data is stored.

If the flow for still picture image processing shown in FIG. 15 is commenced, it is first determined whether or not it is an odd number frame (S92). As was described previously, in the case of the relative drive shown in FIG. 11, in the case where a frame number after rapid shooting commencement is an odd number frame, image data for a still picture is not stored. In this step the CPU 212 performs determination based on the frame number after commencement of rapid shooting.

If the result of determination in step S92 is not an odd number frame, it is determined whether or not it is a frame in which aperture drive is performed (S93). In a case where the aperture 102b is being driven, there are cases where image quality is degraded, and still picture image data is not stored. As was described previously, the CPU 212 performs state transmission So at a specified timing, and receives data information for the aperture from the lens CPU 106. In this step, determination is based on information that has been received from the lens CPU 106.

If the result of determination in step S93 is not a frame in which aperture drive is performed, it is determined whether or not it is a frame in which absolute drive is performed (S95). Here, the CPU 212 determines whether or not absolute drive was instructed in step S53. In the case of absolute drive, then as was described using FIG. 8 image processing for a still picture that used image data that was acquired in each frame is not performed, and there is also no storage of still picture image data.

If the result of determination in step S95 is not a frame in which absolute drive is performed, image processing for a still picture is performed (S97). Here, the image processing circuit 214 applies still picture image processing to image data that has been acquired from the image sensor 208, and stores the still picture image data in the storage medium 230. Once this storage has been performed, the flow for still picture image processing is terminated and the originating flow is returned to.

On the other hand, if the result of determination in step S92 is an odd number frame, or if the result of determination in step S93 is that it is a frame in which aperture drive is performed, or if the result of determination in step S95 is that it is a frame in which absolute drive is performed, then still picture image processing is not applied, in other words still picture image processing is prohibited, the flow for still picture image processing is terminated, and the originating flow is returned to. Operations in the relative drive timing chart shown in FIG. 11 and processing of the flowchart shown in FIG. 15 have the following correspondence. Step S92: Y in FIG. 15 corresponds to times T4 to T6, and T10 to T13 in FIG. 11. Also, step S92: N→S93: N→S95: N→S97 in FIG. 15 corresponds to times T7 to T10 in FIG. 11.

In this way, in the flow for still picture image processing shown in FIG. 15, still picture image processing is not applied to odd number frames when relative drive is performed, frames in which aperture drive is being performed, and frames when absolute drive is being performed. In the event that these conditions are satisfied, since still picture image processing is not performed and there is no storage as a still picture, it is possible to prevent a still picture that does not have sufficient image quality being stored. Also, since this image processing is omitted, it is possible to prevent waste of electrical power due to image processing. It should be noted that in step S92 of FIG. 15 it is determined whether or not there is an odd number frame. However, in a case where frames in which relative drive is performed are set to even number frames, whether or not there are even number frames may be determined instead.

Next, detailed operation of a modified example of the image processing for a still picture in step S55 will be described using the flowchart shown in FIG. 16. The flowchart shown in FIG. 16 is applied to a system in which it is assumed that the relative drive shown in FIG. 12 will be performed. This flowchart shown in FIG. 16 differs from the flowchart shown in FIG. 15 in that step S92 has been deleted, and step S96 has been added. Description will therefore concentrate on this point of difference.

If the flow for still picture image processing shown in FIG. 16 is commenced, it is first determined whether or not it is a frame in which aperture drive is performed (S93). If the result of this determination is not a frame in which aperture drive is performed, it is determined whether or not it is a frame in which absolute drive is performed (S95).

If the result of determination in step S95 is not a frame in which absolute drive is performed, it is determined whether or not an absolute value of relative drive amount (converted to image plane movement amount) is larger than 2Fδ (S96). As was described using FIG. 12, if depth of focus is lower than a predetermined value there is no problem with respect to image quality of a still picture. Here, the CPU 212 determines whether or not an absolute value of relative drive amount (converted to image plane movement amount) is larger than 2Fδ (depth of focus). It should be noted that F is aperture value and δ is permissible circle of confusion.

If the result of determination in step S96 is that absolute value of relative drive amount (converted to image plane movement amount) is not larger than 2Fδ, still picture image processing is performed (S97). If still picture image processing has been performed and a still picture has been stored, the flow for still picture image processing is terminated, and the originating flow is returned to. On the other hand, if the result of determination in step S93 is that it is a frame in which aperture drive is performed, or if the result of determination in step S95 is that it is a frame in which absolute drive is performed, or if absolute value of relative drive amount is larger than 2Fδ, still picture image processing is not performed, the flow for still picture image processing is terminated, and the originating flow is returned to. Operations in the relative drive timing chart that was shown in FIG. 12 and processing in the flowchart that was shown in FIG. 16 correspond to an operation of repeatedly executing S93: N→S95: N→S96: N→S97 in FIG. 16.

In this way, in the flow for still picture image processing shown in FIG. 16, still picture image processing is not applied to frames in which aperture drive has been performed, frames in which absolute drive has been performed and frames in which absolute value of relative drive amount (converted to image plane movement amount) is larger than 2Fδ (in other words, still picture image processing is prohibited). In the event that these conditions are satisfied, since there is no storage as a still picture, it is possible to prevent a still picture that does not have sufficient image quality being stored. Also, since this image processing is omitted, it is possible to prevent waste of electrical power for image processing. In FIG. 15, image processing for a still picture is only applied to even number frames and image data of a still picture is stored, but in FIG. 16 still picture image processing is applied to even number frames and to odd number frames, and still picture image data is stored. As a result, the rapid shooting speed in FIG. 16 becomes twice as fast compared to that in FIG. 15.

Therefore, with one embodiment of the present invention, alternate readout is performed during rapid shooting CAF (continuous AF). This alternate readout is the alternate performing of readout for still picture exposure and readout for phase difference detection exposure (PD divided exposure). The image sensor 208 and the photographing lens 102*a* execute lens drive in synchronism (refer to the lens synchronization signal in FIG. 7). Then, in a case where the focus lens is driven significantly (refer to absolute drive and FIG. 8), and in a case of aperture drive, still picture image data are prevented from being left. Specifically, still picture image processing is not performed (refer to S55 in FIG. 13B, S55 Yes in FIG. 15, and S97 being skipped in the case of S93 Yes). In this way, since image processing is omitted for frames for which image quality cannot be ensured, it is possible to prevent wasted power due to image processing. Also, as a result of not saving unnecessary images in the media (storage medium 230), the user does not need to perform operations such as deleting the unnecessary images.

Also, with the one embodiment of the present invention, when performing lens drive a constant speed drive instruction (scan drive instruction) is issued in conformity with subject movement speed (refer to FIG. 9). Also, in a case where movement velocity of the subject is different, and a case where defocus amount has changed, drive speed is changed (refer to FIG. 10). As a result, it is possible to appropriately update the scan drive instruction in accordance with movement velocity of the subject forward and backward, it becomes possible to finely track the subject, and it is possible to ensure appearance quality of a still picture image.

Figure 11:
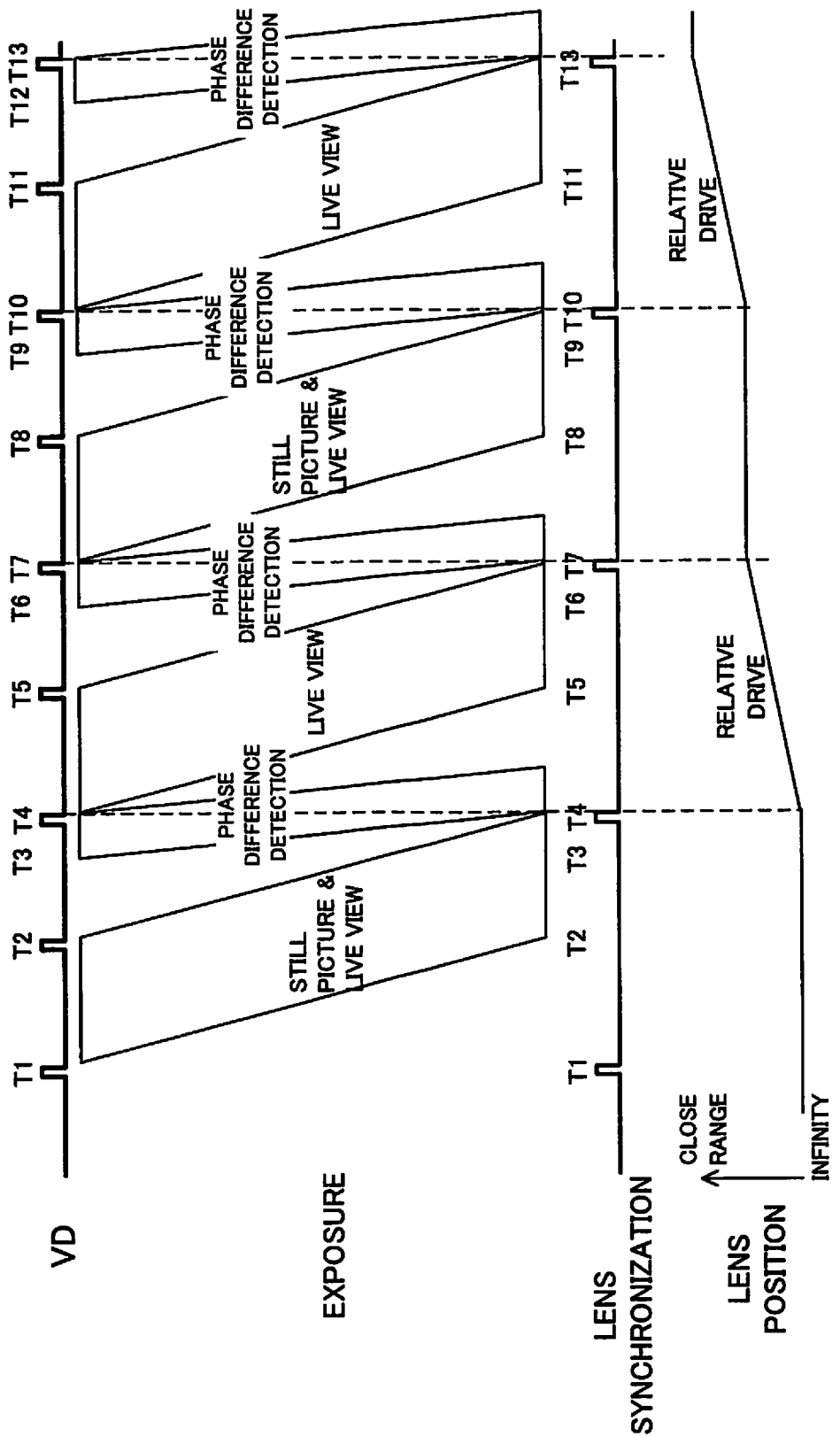
FIG. 11 is a timing chart showing operation in a case of relative drive of a focus lens, at the time of still picture rapid shooting, in the imaging device of one embodiment of the present invention.

Also, with the one embodiment of the present invention, at the time of relative drive, if microdrive of the focus lens is executed, lens drive is not executed in one of two frames of still picture exposure, while lens drive is executed in the other frame (refer to FIG. 11). Still picture exposure during lens drive is only used in live view display, and for frames in which lens drive is not performed still picture exposure is executed (refer to FIG. 11 and to S92 and S97 in FIG. 15).

Also, with the one embodiment of the present invention, in a case where extreme microdrive of the focus lens is executed, still picture exposure is executed for every frame (referred to FIG. 12 and FIG. 16).

As has been described above, with the one embodiment of the present invention, the image sensor has a plurality of photo-diodes arranged divided in a given pupil division direction, for a single micro-lens, so that a pixel signal is generated by subjecting respective light flux, that passes through different exit pupil regions of an imaging optical system, to photoelectric conversion (refer to FIG. 3 and FIG. 4). Also, the image sensor is capable of setting an imaging mode that alternately and repeatedly switches between a first imaging operation in which a pixel signal resulting from combining pixels signals corresponding to the pupil-division direction is generated and output, and a second imaging operation in which a pixel signal corresponding to the pupil-division direction is generated and output. For example, as shown in FIG. 5, an imaging operation for a still picture at times T1 to T2, T4 to T5, T7 to T8, and T10 to T11, and an image operation for phase difference detection at times T3-T4, T6 to T7, and T9 to T10, are executed. With previously described patent publication 3, LV display is performed using a pixel signal of a sensor for focus and photometry processing, and appropriate exposure control is performed on divided PDs for focus, and so display quality is lowered. However, with this embodiment, exposure for performing focus control (imaging operation for phase difference detection), and an exposure for photometry (imaging operation for still picture), are performed at separate times, which means that it is possible to achieve appropriate exposure for images for display also, and there is no reduction in appearance quality of a display image.

Also, with the one embodiment of the present invention, a control section (for example, CPU 212) executes focus control to display image data based on a pixel signal output as a result of the first imaging operation from the image sensor, or perform processing to store as a still picture, and generate focus adjustment data by performing focus detection based on a pixel signal output as a result of the second imaging operation. For example, as shown in FIG. 5, an imaging operation for a still picture at times T1 to T2, T4 to T5, T7 to T8, and T10 to T11 is performed, and an imaging operation for phase difference detection at times T3-T4, T6 to T7, and T9 to T10 is performed (refer, for example, to S43 in FIG. 13B). Specifically, processing for still picture storage and processing for focus control are performed at separate times. This means that it is possible to also optimize processing for phase difference detection, while maintaining appearance quality of an image for still picture storage.

Also, with the one embodiment of the present invention, the control section (for example, CPU 212) computes focus movement amount based on focus adjustment data, and if the focus movement amount is larger than a predetermined value, and focus control based on the focus movement amount and the first imaging operation are executed in parallel, prohibits processing for storage as a still picture on image data based on a pixel signal of the first imaging operation (refer, for example, to absolute drive in FIG. 8, and skipping of S97 in the case of S92 Yes in FIG. 15). This means that it is possible to prevent degradation in image quality of a still picture while performing rapid shooting at high-speed.

Also, with the one embodiment of the present invention, the control section (CPU 212) executes processing on image data in order to perform display based on a pixel signal of the first imaging operation, regardless of focus movement amount. For example, although in FIG. 8 still pictures storage is prohibited based on image data that has been acquired at time T4 to T5 and T7 to T8, live view display is permitted. As a result, since live view display is performed even during rapid shooting, the user can take photographs while looking at the subject.

Also, with the one embodiment of the present invention, the control section (CPU 212) determines whether or not to execute the focus control in parallel with the first imaging operation based on the focus adjustment data, and if the focus control is executed in parallel with a current first imaging operation, among first imaging operations that are repeatedly executed, does not execute the focus control in parallel with the next first imaging operation. For example, in FIG. 11, although focus drive is being performed at from time T4 to T7, from time T7 to T10 that follows, focus drive is prohibited. In the event that focus drive amount is a minuscule amount, there is disturbance in control, such as overshoot, and image quality of a still picture will be degraded. By contrast, with this embodiment it is possible to follow a moving body using drive amount to the extent that there is no disturbance in control, such as overshoot.

Also, with the one embodiment of the present invention, the control section (CPU 212) performs focus control to restrict change amount of defocus amount to less than a predetermined value, in a case where focus control is performed in parallel with the first imaging operation that is repeatedly executed. For example, with the relative drive of FIG. 12, change amount in defocus amount is set to be less than a predetermined value. If defocus amount becomes greater than the predetermined value, storage of a still picture is prohibited (refer, for example, to S96 in FIG. 16). This means that still picture storage is not executed in the case of a focus drive amount that would reduce image quality of the still picture Also, with the one embodiment of the present invention, the control section (CPU 212) calculates image plane movement velocity corresponding to a subject based on a plurality of focus adjustment data, and performs focus control in accordance with the image plane movement velocity that has been calculated. For example, in FIG. 10, if image plane movement velocity changes at time T7, drive speed of the lens is changed. This means that it is possible to change movement velocity of the focus lens in conformity with change in movement velocity of the subject, and there is no lowering of image quality of still pictures that are taken using rapid shooting.

Also, with the one embodiment of the present invention, an interchangeable lens includes a focus lens control section that controls position of a focus lens contained in the imaging optical system (refer, for example, to the lens CPU 106). This focus lens control section communicates with a control section to execute position control of the focus lens in synchronization with a first imaging operation and second imaging operation of the image sensor. For example, focus lens position control for the interchangeable lens is performed based on a lens synchronization signal shown in FIG. 7. This means that it is possible to synchronize an imaging operation and focus operation by simply notifying control timing for the focus lens with the lens synchronization signal as a reference by means of communication from the camera body.

It should be noted that with the one embodiment of the present invention, at the time of outputting a lens drive instruction, and when determining whether or not to execute image processing for a still picture, determinations are based on subject distance, subject movement speed, and image plane movement velocity. These determinations may also be performed by appropriately changing combinations, and further adding other conditions etc. Also, the image pixels of the image sensor are all constructed to be divided into focus detection pixels. However, some pixels may be divided into focus detection pixels, and other pixels not divided. Also, with the one embodiment of the present invention, although focus adjustment (focus operation) is performed using a focus lens, a mechanism to move the image sensor may be provided, and the image sensor may be moved in the optical axis direction.

It should be noted that with the one embodiment of the present invention, all or some of the focus detection circuit 218, image processing circuit 214, image compression and expansion section 216, exposure control circuit 220 etc. may be integrated with the CPU 212 and the peripheral circuitry of the CPU. It is also possible for the focus detection circuit 218, image processing circuit 214, image compression and expansion section 216, exposure control circuit 220 etc. to have a hardware structure such as gate circuits that have been generated based on a programming language that is described using Verilog, and also to use a hardware structure that utilizes software such as a DSP (digital signal processor). Suitable combinations of these approaches may also be used.

Also, with this embodiment, an instrument for taking pictures has been described using a digital camera, but as a camera it is also possible to use a digital single lens reflex camera or a compact digital camera, or a camera for movie use such as a video camera, and further to have a camera that is incorporated into a mobile phone, a smartphone, a mobile information terminal, personal computer (PC), tablet type computer, game console etc., a medical camera, or a camera for a scientific instrument such as a microscope, a camera for mounting on a vehicle, a surveillance camera etc. In any event, it is possible to apply the present invention as long as a device is for shooting that, when performing exposure for storage, also performs exposure for focus detection. For example, the present invention may be applied to an industrial endoscope for remote visual inspection, to an industrial video scope, and to a medical endoscope, and focus adjustment may be performed in accordance with change in subject distance caused by movements of a camera section in the end of a fiber or cable, with respect to a subject that has a fixed position. At that time, focus adjustment may be executed by performing relative moving body estimation computation in accordance with movement of an end camera section for a subject that has a fixed position, by predicting focus position at the time of current actual exposure of a still picture based on history of results of previous focus deviation amount calculations that have been stored (focus positions).

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A focus adjustment device, comprising:
    an image sensor with a plurality of photodiodes that have been divided in a given pupil-division direction, for a single microlens, and that generates a pixel signal by subjecting respective light fluxes that have passed through different exit pupil regions of an imaging optical system to photoelectric conversion, and further is capable of setting an imaging mode for alternately and repeatedly executing a first imaging operation to generate and output a pixel signal resulting from having combined pixel signals corresponding to the pupil-division direction, and a second imaging operation for generating and outputting a pixel signal corresponding to the pupil-division direction, and
    a processor that, during rapid shooting of still pictures, displays an image or performs processing for storage as still picture data based on a pixel signal output as a result of the first imaging operation from the image sensor, and generate focus adjustment data by performing focus detection based on a pixel signal output as a result of the second imaging operation, and executes focus control wherein
    the processor computes focus movement amount based on the focus adjustment data, and if the focus movement amount is larger than a predetermined value, and focus control based on the focus movement amount and the first imaging operation are executed in parallel, prohibits processing for storage as a still picture on image data based on a pixel signal of the first imaging operation.

2. The focus adjustment device of claim 1, wherein:
    the processor executes processing for performing display of an image based on a pixel signal of the first imaging operation, regardless of the focus movement amount.

3. The focus adjustment device of claim 1, wherein:
    the processor determines whether or not to execute the focus control in parallel with the first imaging operation based on the focus adjustment data, and if the focus control is executed in parallel with a current first imaging operation, among first imaging operations that are repeatedly executed, does not execute the focus control in parallel with the next first imaging operation.

4. The focus adjustment device of claim 1, wherein:
    the processor performs focus control by restricting change amount of defocus amount to less than a predetermined value, in the event that focus control is executed in parallel with the first imaging operation that is repeatedly executed.

5. The focus adjustment device of claim 1, wherein:
    the processor calculates image plane movement velocity corresponding to a subject based on a plurality of focus adjustment data, and performs focus control based on the image plane movement velocity that has been calculated.

6. The focus adjustment device of claim 1, further comprising:
    an interchangeable lens that includes the imaging optical system, and a main body to which the interchangeable lens can be attached, wherein
    the main body includes the image sensor and the processor, and
    the interchangeable lens includes a focus lens processor that controls position of a focus lens included in the imaging optical system, and the focus lens processor executes position control of the focus lens in synchronism with the first imaging operation and the second imaging operation of the image sensor by communicating with the processor.

7. The focus adjustment device of claim 1, further comprising:
    an actuator that drives an aperture that is included in the imaging optical system, wherein
    the processor computes focus movement amount based on the focus adjustment data, and if the focus movement amount is larger than a predetermined value, and focus control based on the focus movement amount and the first imaging operation are executed in parallel, or if the first imaging operation is executed in parallel during the aperture drive, prohibits processing for storage as a still picture on image data based on a pixel signal of the first imaging operation.

8. A focus adjustment method for a focus adjustment device of an imaging device having an image sensor with plurality of photodiodes that have been divided in a given pupil-division direction, for a single microlens, and that generates a pixel signal by subjecting respective light fluxes that have passed through different exit pupil regions of an imaging optical system to photoelectric conversion, comprising:
    alternately and repeatedly switching between a first imaging operation of generating and outputting a pixel signal resulting from having combined pixel signals corresponding to the pupil-division direction, and a second imaging operation generating and outputting a pixel signal corresponding to the pupil-division direction,
    during rapid shooting of still pictures, displaying an image or performing processing for storage as still picture data based on a pixel signal output as a result of the first imaging operation from the image sensor, generating focus adjustment data by performing focus detection based on a pixel signal output as a result of the second imaging operation, and executing focus control, and
    computing focus movement amount based on the focus adjustment data, and if the focus movement amount is larger than a predetermined value, and focus control based on the focus movement amount and the first imaging operation are executed in parallel, prohibiting processing for storage as a still picture on image data based on a pixel signal of the first imaging operation.

9. The focus adjustment method of claim 8, further comprising:
    executing processing for performing display of image based on a pixel signal of the first imaging operation, regardless of the focus movement amount.

10. The focus adjustment method of claim 8, further comprising:
determining whether or not to execute the focus control in parallel with the first imaging operation based on the focus adjustment data, and if the focus control is executed in parallel with a current first imaging operation, among first imaging operations that are repeatedly executed, not executing the focus control in parallel with the next first imaging operation.

11. The focus adjustment method of claim 8, further comprising:
performing focus control by restricting change amount of defocus amount to less than a predetermined value, in the event that focus control is executed in parallel with the first imaging operation that is repeatedly executed.

12. The focus adjustment method of claim 8, further comprising:
calculating image plane movement velocity corresponding to a subject based on a plurality of focus adjustment data, and performing focus control based on the image plane movement velocity that has been calculated.

13. The focus adjustment method of claim 8, wherein:
the imaging device includes the imaging optical system, and a main body to which the interchangeable lens can be attached, and
the interchangeable lens controls position of a focus lens included in the imaging optical system, and executes position control of the focus lens in synchronism with the first imaging operation and the second imaging operation of the image sensor.

14. The focus adjustment method of claim 8, further including:
an actuator that drives an aperture that is included in the imaging optical system, wherein
the focus adjustment method computes focus movement amount based on the focus adjustment data, and if the focus movement amount is larger than a predetermined value, and focus control based on the focus movement amount and the first imaging operation are executed in parallel, or if the first imaging operation is executed in parallel during the aperture drive, prohibits processing for storage as a still picture on image data based on a pixel signal of the first imaging operation.

15. A non-transitory computer-readable medium storing a processor executable code, which when executed by at least one processor which is provided in a focus adjustment device in an imaging apparatus, performs a focus adjustment method, the imaging apparatus having an image sensor with plurality of photodiodes that have been divided in a given pupil-division direction, for a single microlens, and that that generates a pixel signal by subjecting respective light fluxes that have passed through different exit pupil regions of an imaging optical system to photoelectric conversion, and the focus adjustment method comprising:
alternately and repeatedly switching between a first imaging operation of generating and outputting a pixel signal resulting from having combined pixel signals corresponding to the pupil-division direction, and a second imaging operation generating and outputting a pixel signal corresponding to the pupil-division direction,
during rapid shooting of still pictures, displaying an image or performing processing for storage as still picture data based on a pixel signal output as a result of the first imaging operation from the image sensor, generating focus adjustment data by performing focus detection based on a pixel signal output as a result of the second imaging operation, and executing focus control, and
computing focus movement amount based on the focus adjustment data, and if the focus movement amount is larger than a predetermined value, and focus control based on the focus movement amount and the first imaging operation are executed in parallel, prohibiting processing for storage as a still picture on image data based on a pixel signal of the first imaging operation.

16. The non-transitory computer-readable medium of claim 15, storing further processor executable code, which when executed by the at least one processor, causes the at least one processor to perform a method further comprising:
executing processing for performing display of image data based on a pixel signal of the first imaging operation, regardless of the focus movement amount.

17. The non-transitory computer-readable medium of claim 15, storing further processor executable code, which when executed by the at least one processor, causes the at least one processor to perform a method further comprising:
determining whether or not to execute the focus control in parallel with the first imaging operation based on the focus adjustment data, and if the focus control is executed in parallel with a current first imaging operation, among first imaging operations that are repeatedly executed, not executing the focus control in parallel with the next first imaging operation.

18. The non-transitory computer-readable medium of claim 15, storing further processor executable code, which when executed by the at least one processor, causes the at least one processor to perform a method further comprising:
performing focus control by restricting change amount of defocus amount to less than a predetermined value, in the event that focus control is executed in parallel with the first imaging operation that is repeatedly executed.

19. The non-transitory computer-readable medium of claim 15, storing further processor executable code, which when executed by the at least one processor, causes the at least one processor to perform a method further comprising:
calculating image plane movement velocity corresponding to a subject based on a plurality of focus adjustment data, and performing focus control based on the image plane movement velocity that has been calculated.

20. The non-transitory computer-readable medium of claim 15, the imaging apparatus further comprising an actuator that drives an aperture that is included in the imaging optical system, and the medium storing further processor executable code, which when executed by the at least one processor, causes the at least one processor to perform a method further comprising:
the focus adjustment method computes focus movement amount based on the focus adjustment data, and if the focus movement amount is larger than a predetermined value, and focus control based on the focus movement amount and the first imaging operation are executed in parallel, or if the first imaging operation is executed in parallel during the aperture drive, prohibits processing for storage as a still picture on image data based on a pixel signal of the first imaging operation.

\* \* \* \* \*